(12) United States Patent
Tong et al.

(10) Patent No.: US 6,376,802 B1
(45) Date of Patent: Apr. 23, 2002

(54) METHOD OF CONTROLLING THE AC PULSED ARC WELDING AND WELDING POWER SUPPLY APPARATUS THEREFOR

(75) Inventors: Honjyun Tong, Takatsuki; Tomoyuki Ueyama, Taki-gun; Norihito Takahashi; Hideo Shiozaki, both of Takatsuki; Hiroyasu Mondori, Kyoto, all of (JP)

(73) Assignee: Daihen Corporation, Osaka-fu (JP)

( * ) Notice: Subject to any disclaimer, the term of this patent is extended or adjusted under 35 U.S.C. 154(b) by 0 days.

(21) Appl. No.: 09/717,489

(22) Filed: Nov. 21, 2000

(30) Foreign Application Priority Data

Nov. 24, 1999 (JP) ............................................ 11-333234

(51) Int. Cl.[7] ............................................... B23K 9/09
(52) U.S. Cl. ............................ 219/137 PS; 219/130.21; 219/130.51
(58) Field of Search ...................... 219/137 PS, 130.21, 219/130.51

(56) References Cited

U.S. PATENT DOCUMENTS

| | | | | |
|---|---|---|---|---|
| 3,598,954 A | * | 8/1971 | Iceland et al. | 219/130.51 |
| 3,781,508 A | * | 12/1973 | Dauer et al. | 219/130.51 |
| 5,990,445 A | * | 11/1999 | Ogasawara et al. | 219/130.51 |

* cited by examiner

Primary Examiner—Clifford C. Shaw
(74) Attorney, Agent, or Firm—Scully, Scott, Murphy & Presser

(57) ABSTRACT

An consumable electrode AC pulsed arc welding is performed by repeatedly executing a cycle of supplying a peak current Ip in an electrode positive polarity, then supplying an electrode negative current Ien in an electrode negative polarity and finally supplying a base current Ib in the electrode positive polarity. During a base current supply time, the rate of increase $dVb/dt$ of the base voltage Vb is detected. Should the base voltage increase rate $dVb/dt$ detected be larger than a predetermined determining value $\Delta Vu$, it means that the arc interruption is likely to occur and, therefore, since that timing, the peak current Ip for the subsequent cycle is supplied to thereby prevent the arc interruption from occurring.

4 Claims, 17 Drawing Sheets

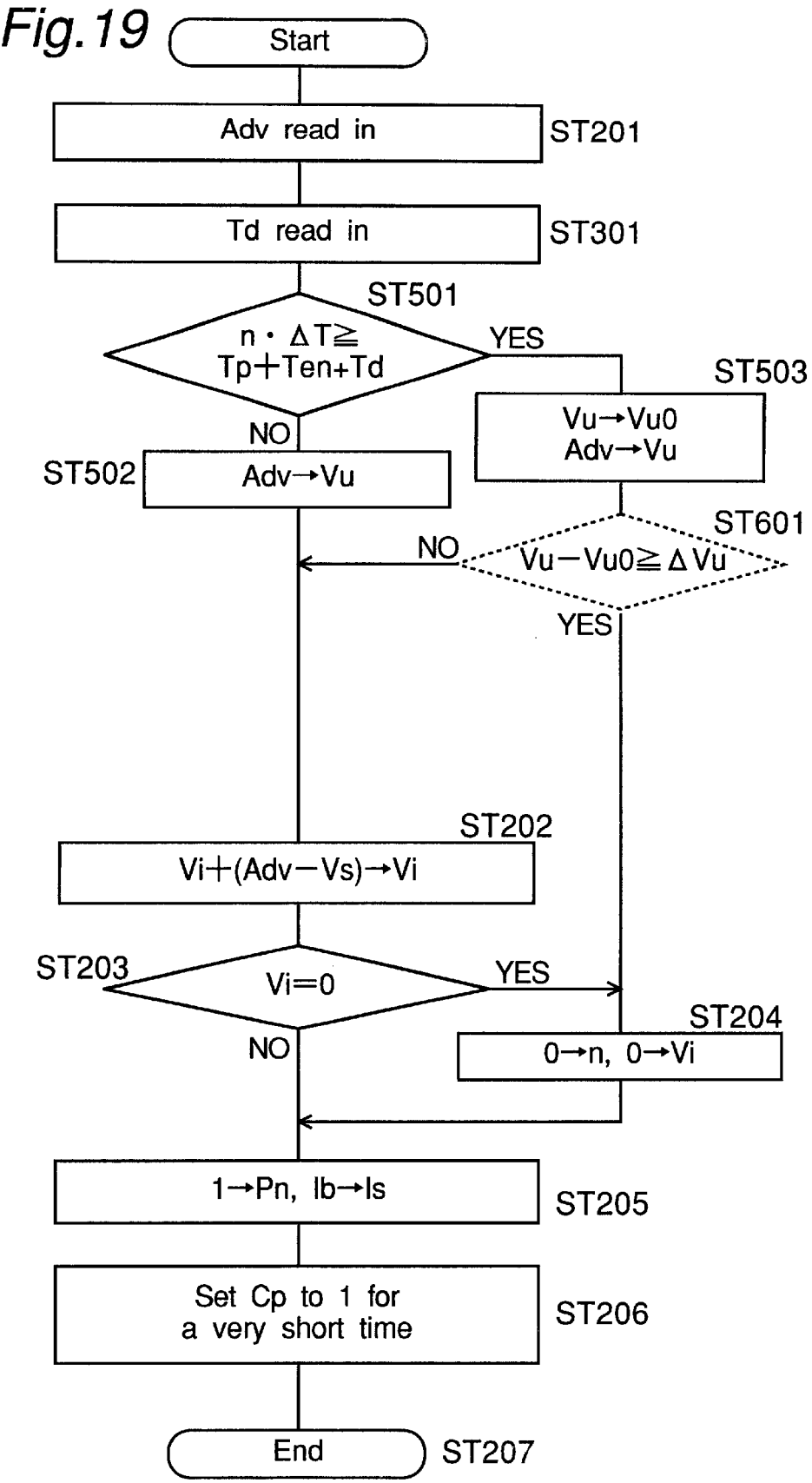

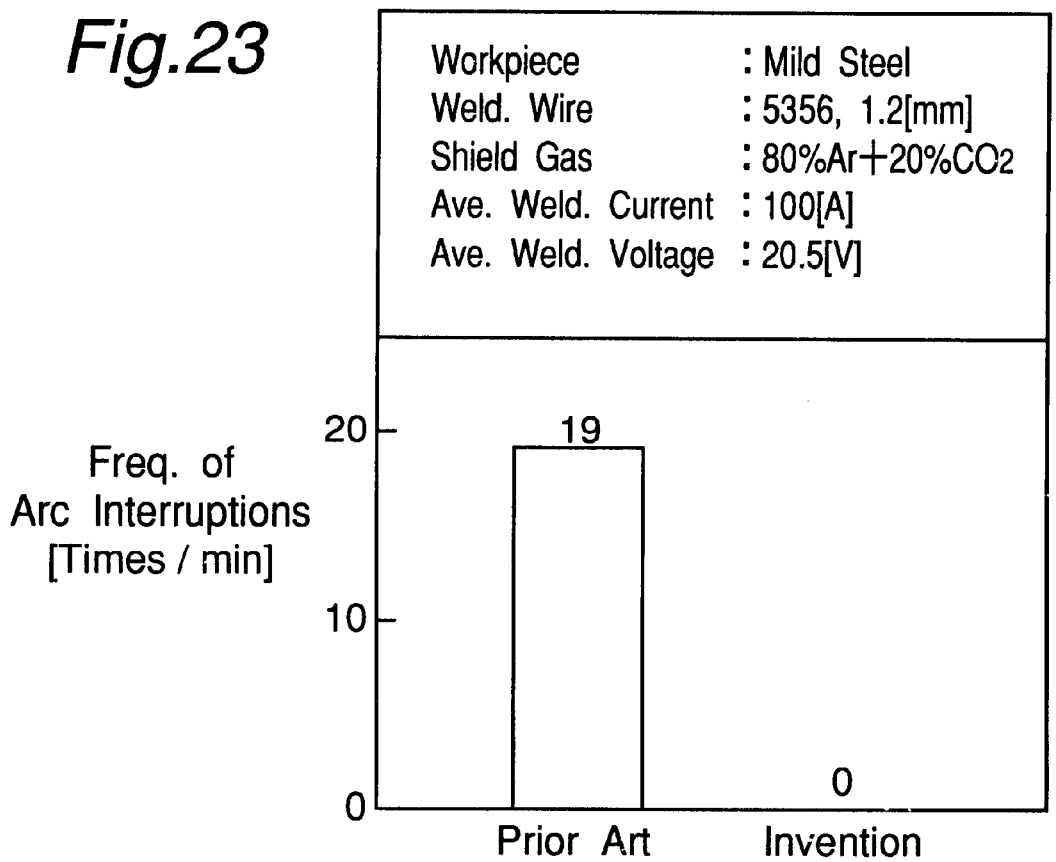

METHOD OF CONTROLLING THE AC PULSED ARC WELDING AND WELDING POWER SUPPLY APPARATUS THEREFOR

BACKGROUND OF THE INVENTION

1. Field of the Invention

The present invention generally relates to the art of AC pulsed arc welding utilizing a consumable electrode and, more particularly to a method of controlling the consumable electrode AC pulsed arc welding and a welding power supply apparatus therefor, which are effective to avoid an arc interruption, which is apt to occur upon re-ignition subsequent to polarity switching of the electrode, thereby to provide a high weld quality in a workpiece to be welded.

2. Description of the Prior Art

The AC pulsed arc welding is well known in the art and is a process wherein, while a welding wire is supplied at a predetermined feed speed, a first arc generating interval with the welding wire held at a positive polarity (which interval is hereinafter referred to as an "EP (electrode-positive) arcing interval") wherein an arc is generated between the welding wire and the workpiece to be welded that are then polarized to positive and negative poles, respectively, and a second arc generating interval with the welding wire held at a negative polarity (which interval is hereinafter referred to as an "EN (electrode-negative) arcing interval") wherein an arc is generated between the welding wire and the workpiece to be welded that are then polarized to negative and positive poles, respectively, are alternately repeated. Accordingly, the welding current flows from the welding wire towards the workpiece to be welded during the EP arcing interval and from the workpiece to be welded towards the welding wire during the EN arcing interval.

The AC pulsed arc welding process is largely employed for welding aluminum, aluminum alloy, stainless steel, steel or the like and is often employed particularly where the workpiece to be welded is in the form of a thin plate of any of those metallic materials having a few millimeter or less in thickness. The reason for frequent use of the AC pulsed arc welding in welding the thin plate will now be discussed.

In the practice of the AC pulsed arc welding, the workpiece to be welded assumes a negative pole during the EP arcing interval and the heat input to the workpiece increases as a result of a voltage drop at the negative pole. On the other hand, during the workpiece to be welded assumes a positive pole during the EN arcing interval and the heat input to the workpiece occurs as a result of a voltage drop at the positive pole, but the amount of voltage dropped at the positive pole is so small as compared with that at the negative pole that the heat input to the workpiece can decrease. Accordingly, when a time ratio between the EP arcing interval and the EN arcing period is controlled, the magnitude of the heat input to the workpiece can be adjusted as desired. In the case of the thin plate to be welded, an excessively large heat input to the workpiece tends to result in a burn-through and an excessively small heat input to the workpiece tends to result in an incomplete penetration, whichever is a weld defect. Accordingly, the AC pulsed arc welding process in which the heat input to the workpiece can be controlled is indeed suited for welding thin plates.

FIG. 1 is a chart illustrative of changes in welding current and voltage Iw and Vw with time, which are shown in timed relation with each other. The AC pulsed arc welding process will now be discussed with reference to the charts shown in FIG. 1.

(1) Timings t1 to t2: (Peak Current Supply Time Tp)

As shown by the waveform Iw, a peak current Ip is supplied during the peak current supply time Tp with the welding wire set to a positive pole. In general, the peak current supply time Tp and the peak current Ip are preset to respective values sufficient to allow a single molten droplet of the welding wire, then melted as a result of arc heating, to transfer for each pulse. Also as shown by the waveform Vw, during the peak current supply time Tp, a peak voltage Vp corresponding to the peak current Ip is supplied between the welding wire and the workpiece to be welded that are then held positive and negative, respectively.

(2) Timings t2 to t3: (EN Current Supply Time Ten)

At the timing t2, the EP polarity (i.e., the polarity of the welding wire that is held positive) is switched over to the EN polarity (i.e., the polarity of the welding wire that is held negative) and, as shown by the waveform Iw, an EN current Ien is supplied during the EN current supply time Ten. In general, the EN current supply time Ten and the EN current Ien are preset to respective suitable values determined in dependence on the type of material for the workpiece to be welded, the plate thickness, the shape thereof and others.

Also, as shown by the waveform Vw, an arc generated during a duration of the EP polarity is extincted at the timing t2 and, in order for the arc to be re-ignited instantaneously during the subsequent duration of the EN polarity, it is necessary for a high re-igniting voltage Vrs of about 200 to about 500 volts to be applied at the time of the polarity switching. In the event that the re-igniting voltage Vrs is not applied or is too low at the time of the polarity switching, the arc will no longer be re-ignited during the duration of the EN polarity and an arc interruption may therefore result in. On the other hand, if the arc is re-ignited during the duration of the EN polarity as a result of application of the re-igniting voltage Vrs at the timing t2, an EN voltage Ven corresponding to the EN current Ien is applied during the EN current supply time Ten between the welding wire and the workpiece to be welded that are then held negative and positive, respectively.

(3) Timings t3 to t4: (Base Current Supply Time Tb)

At the timing t3, the EN polarity is again resumed from the EP polarity and, as shown by the waveform Iw, a base current Ib is supplied during the base current supply time Th. This base current supply time Tb is determined by a base current supply time control (hereinafter referred to as a "Tb control") as will be described later. Specifically, the base current supply time Tb is so determined that the sum of an integral of the difference between the peak voltage Vp and a preset voltage Vs during the peak current supply time Tp, that is, $\int (Vp-Vs)dt$, and an integral of the difference between the base voltage Vb and the preset voltage Vs during the base current supply time Tb, that is, $\int (Vp-Vs)dt$, will be substantially zero, as shown by the following equation.

$$\int (Vp-Vs)dt \int (Vb-Vs)dt = 0 \qquad (1)$$

Also, as shown by the waveform Vw, the arc generated during a duration of the EN polarity is extincted at the timing t3 and, in order for the arc to be re-ignited instantaneously during the subsequent duration of the EP polarity, it is necessary for a high re-igniting voltage Vrs to be applied as is the case with that occurring during the EN current supply time Ten. If the arc is re-ignited during the duration of the EP polarity, a base voltage Vb corresponding to the base current Ib is applied during the base current supply time Tb between the welding wire and the workpiece to be welded that are then held positive and negative, respectively.

Subsequent to the timing t4, the peak current supply time Tp, the EN current supply time Ten and the base current supply time Tb are sequentially repeated to perform the arc welding.

FIG. 2 illustrates a block diagram of the prior art welding power supply apparatus used in the practice of the above discussed AC pulsed arc welding process. Referring now to FIG. 2, the prior art welding power supply apparatus shown therein is electrically powered by a commercial mains AC, predominantly three-phase 200/220 volts.

The illustrated welding power supply apparatus includes an output control circuit INV that is made up of a primary rectifier circuit for rectifying an alternating current power from the commercial mains AC, a smoothing circuit for smoothing the rectified voltage having ripples, an inverter circuit for converting the smoothed direct current voltage into a high frequency alternating current, a drive circuit for driving a power transistor forming a part of the inverter circuit, and a PWM control circuit utilizing an error amplification signal Ea, as will be described later, as a control signal for performing a PWM control of the inverter circuit.

A high frequency transformer INT is operable to drop the high frequency alternating current down to a voltage appropriate to a welding arc load. Rectifiers D2a to D2d connected with the secondary winding of the high frequency transformer INT are utilized to rectify the voltage-dropped high frequency alternating current into a direct current.

A re-igniting voltage applying circuit VRS applies the re-igniting voltage Vrs, as discussed with reference to FIG. 1, during a period in which an EP or EN switching time re-igniting signal Cp or Cn, generated at the time of EP polarity switching or at the time of EN polarity switching, respectively, as will be described later, is in a high level state. The EP switching time re-igniting signal Cp generated at the time of EP polarity switching is in a high level state during a period of a few hundreds microseconds at the time of switching from the EN polarity to the EP polarity and, during this period, the positive re-igniting voltage Vrs is applied between a point of plus potential A1 (+) and a point of zero potential A0 (0 V) so that the positive re-igniting voltage Vrs can be applied between the welding wire 1 (+) and the workpiece 2 to be welded (0 V). On the other hand, the EN switching time re-igniting signal Cn generated at the time of EN polarity switching is in a high level state during a period of a few hundreds microseconds at the time of switching from the EP polarity to the EN polarity and, during this period, a negative re-igniting voltage Vrs different from the positive re-igniting voltage referred to above is applied between a point of minus potential A2 (−) and the point of zero potential A0 (0 V) so that the negative re-igniting voltage Vrs can be applied between the welding wire 1 (−) and the workpiece 2 to be welded (0 V).

An EP polarity transistor PTR is switched on to establish the EP arcing interval when an EP polarity drive signal Pd as will be described later is held in a high level state. An EN polarity transistor NTR is switched on to establish the EN arcing interval when an EN polarity drive signal Nd as will be described later is held in a high level state. Since the EP and EN polarity drive signals Pd and Nd are logically reversal to each other, one of them is held in a low level state when the other of them is held in a high level state, and vice versa. A reactor WL smoothes a current having ripples and flowing through the EP polarity transistor PTR or the EN polarity transistor NTR and then feeds it to an arc 3. The peak current Ip and the base current Ib during the EP arcing interval discussed with reference to FIG. 1 flows from D2a or D2b to the workpiece 2 to be welded through PTR, then through WL and finally through the welding wire 1. On the other hand, the EN current Ien during the EN arcing period flow from the workpiece 2 to be welded to D2c or D2d through the welding wire 1, then through NTR and finally through WL.

The welding wire 1 drawn from a wire supply roll 5a of a wire supply unit and is fed at a predetermined feed speed through a welding torch 4 and is electrically powered through a contact tip at a distal end of the welding torch to thereby generate an arc 3 between it and the workpiece 2 to be welded.

A welding voltage detecting circuit VD is operable to detect a welding voltage Vw developed between the contact tip and the workpiece to be welded or between output terminals of the welding power supply apparatus to provide a welding voltage detection signal Vd. A welding voltage A/D (analog-to-digital) converting circuit ADV is supplied with the welding voltage detection signal Vd and outputs a welding voltage A/D conversion signal Adv which has been converted from an analog nature into a digital nature. A peak current supply time setting circuit TP outputs a predetermined peak current supply time setting signal Tp. An EN current supply time setting circuit TEN outputs a predetermined EN current supply time setting signal Ten. A peak current setting circuit IP outputs a predetermined peak current setting signal Ip. A base current setting circuit IB outputs a predetermined base current setting signal Ib. An EN current setting circuit IEN outputs a predetermined EN current setting signal Ien.

A current waveform control circuit WC is adapted to receive the welding voltage A/D conversion signal Adv, the voltage setting signal Vs, the peak current supply time setting signal Tp, the EN current supply time Ten, the peak current setting signal Ip, the base current setting signal Ib and the EN current setting signal Ien and processes them by the utilization of a software to provide a current setting signal Is, a polarity switching signal Pn, an EP switching time re-igniting signal Cp and an EN switching time re-igniting signal Cn. The details of the software used to process the signals Adv, Vs, Tp, Ten, Ip, Ib and Ien to provide the signals Is, Pn, Cp and Cn will be described later with reference to FIGS. 3 and 4. The details of the output signals referred to above will also be described later with reference to FIG. 5. A drive circuit DV is adapted to receive the polarity switching signal Pn to provide a high level EP polarity drive signal Pd when the polarity switching signal Pn is in a high level state and a high level EN polarity drive signal Nd when the polarity switching signal Pn is in a low level state.

A current setting D/A (digital-to-analog) converting circuit DAI is adapted to receive the current setting signal Is and to output a current setting D/A conversion signal Dai which has been converted from a digital nature into an analog nature. A welding current detecting circuit ID is operable to detect an alternating current welding current Iw and then to output a welding current detection signal Id. A welding current absolute value circuit IA is adapted to receive the welding current detection signal Id and then to output a welding current absolute value signal Ia indicative of the absolute value of the detection signal Id. An error amplification circuit EA is operable to amplify the difference between the current setting D/A conversion signal Dai and the welding current absolute value signal Ia and then to output an error amplification signal Ea. As described previously, this error amplification signal Ea is used as a control signal to accomplish an output control of the welding power supply apparatus.

With the circuit block diagram discussed above, it is possible to supply the welding current Iw corresponding to the current setting signal Is and, therefore, the welding current Iw and the welding voltage Vw necessary in performance of the AC pulsed arc welding discussed previously with reference to FIG. 1 can be outputted.

FIGS. 3 and 4 illustrate respective flow charts showing the software-based sequence of operation of the current waveform control circuit WC of the prior art welding power supply apparatus of the type discussed above. Referring to these drawings, at step ST101, the peak current supply time setting signal Tp, the EN current supply time setting signal Ten, the peak current setting signal Ip, the base current setting signal Ib and the EN current setting signal Ien are read from an external setting circuit into the software. Also, a waveform counter variable n and a voltage difference integral variable Vi, both of which are a variable used in the software, are reset to zero.

At step ST102, a decision is made to determine if interruption is occurred and, if interruption is occurred, the program flow proceeds to step ST103, but if it is not, a wait is made until the interruption occurs. The interruption occurs for each interruption time ΔT preset to a few tens to a few hundreds microseconds. The software processing of the welding power supply apparatus in its entirety includes, in addition to the software processing performed by the current waveform control circuit WC, a sequential processing of the welding wire feed control, of a shield gas discharge control and of others. For this reason, an interruption process is necessitated so that the software processing by the current waveform control circuit WC can be performed at intervals of a predetermined time.

At step ST103, the waveform counter variable n is incremented by 1 and the voltage setting signal Vs is read from an external setting circuit into the software.

At step ST104, a decision is made to determine if the product of the waveform counter variable n multiplied by the interruption time ΔT is equal to or smaller than the peak current supply time setting signal Tp and if it is equal to or smaller than the peak current supply time setting signal Tp, the program flow goes to step ST105, but if it is not, the program flow goes to step ST108. During the flow from steps ST105 to 107 which takes place if the product of the waveform counter variable n multiplied by the interruption time ΔT is equal to or smaller than the peak current supply time setting signal Tp, a process for switching over to the EP polarity and supplying the peak current Ip is performed.

At step ST105, the polarity switching signal Pn and the current setting signal Is are substituted for 1 and the peak current setting signal Ip, respectively. As discussed previously, when the polarity switching signal Pn is 1 (a high level state), the EP polarity is established and the current setting signal Is becomes the peak current setting signal Ip and, therefore, the peak current Ip is supplied.

At step ST106, the welding voltage A/D conversion signal Adv and the base current setting signal 1b are read from an external circuit into the software.

At step ST107, the difference between the welding current A/ID conversion signal Adv and the voltage setting signal Vs is added to the voltage difference integral variable Vi. At this step, the first term ∫(Vp−Vs)dt of the integral equation (1) is performed so that the base current supply time Tb can be determined according to the Tb control based on the previously discussed equation (1).

At step ST108, a decision is made to determine if the product of the waveform counter variable n multiplied by the interruption time ΔT is equal to or smaller than the sum of the peak current supply time setting signal Tp and the EN current supply time Ten and if it is "YES", the program flow goes to step ST109, but if it is "NO", the program flow goes to step ST111. During the program flow from step ST109 and ST110 that takes place when the decision indicates "YES", a process for switching over to the EN polarity and supplying the EN current Ien is performed.

At step ST109, the polarity switching signal Pn and the current setting signal Is are substituted for 0 and the EN current setting signal Ien, respectively. As discussed previously, when the polarity switching signal Pn is 0 (a low level state), the EN polarity is established and the current setting signal Is becomes the EN current setting signal Ien and, therefore, the EN current Ien is supplied.

At step ST110, triggered by a transition of the polarity switching signal from 1 to 0, the EN switching time re-igniting signal Cn is set to 1 (a high level state) for a very small length of time. At this step, since the EN switching time re-igniting signal Cn assumes the high level state for a very small length of time immediately after having been switched to the EN polarity, the re-igniting voltage Vrs is applied during that time.

At step ST111, a Tb control subroutine as will be described with reference to FIG. 4 is called for. At this step, the polarity is again switched over to the EP polarity and a control of the base current supply time Tb is performed, during which the base current Ib is supplied.

At step ST112, a decision is made to determine if the welding is completed and, if it is "YES", the program flow terminates, but if it is "NO", the program flow returns to step ST 102.

The foregoing program flow is repeated at intervals of the interruption time ΔT.

FIG. 4 illustrates the Th control subroutine forming a part of the software processing. At step ST201, the welding voltage A/D conversion signal Adv is read from an external circuit into the software.

At step ST202, the difference between the welding voltage A/D conversion signal Adv and the voltage setting signal Vs is added to the voltage difference integral variable Vi. At this step, in order to determine the base current supply time Tb according to the Tb control based on the previously described equation (1), the integral of the first term ∫(Vp−Vs)dt of the integral equation (1) is added to the second term ∫(Vp−Vs)dt of the integral equation (1) that is calculated at this step.

At step ST203, a decision is made to determine if the voltage difference integral variable Vi is equal to zero and if it is "YES", the program flow goes to step ST204, but if it is "NO", the program flow goes to step ST205. At this step, a decision is made to determine if the previously described equation (1) establishes and if it is "YES", the program flow to terminate (ST204) the base current supply time Tb is performed.

At step ST204, the waveform counter variable n and the voltage difference integral variable Vi are reset to zero. At this step, a program flow to terminate the base current supply time Tb is performed.

At step ST205, the polarity switching signal Pn and the current setting signal Is are substituted for 1 and the base current setting signal Ib, respectively. As hereinbefore discussed, when the polarity switching signal Pn is 1 (a high level state), the EP polarity is established and the current setting signal Is becomes the base current setting signal Ib and, therefore, the base current Ib is supplied.

At step ST206, triggered by a transition of the polarity switching signal from 0 to 1 (i.e., switching from the EN polarity over to the EP polarity), the EP switching time re-igniting signal Cp is set to 1 (a high level state) for a very small length of time. At this step, since the EP switching time re-igniting signal Cp assumes the high level state for a very small length of time immediately after having been switched to the EP polarity, the re-igniting voltage Vrs is applied during that time.

At step ST207, the subroutine terminates and the program flow resumes the main routine shown in FIG. 3.

FIG. 5 illustrates the timing chart showing in timed relation, respective time-dependent changes of the various signals appearing in the prior art welding power supply apparatus which have been discussed with reference to FIGS. 2 to 4. It is to be noted that since the welding current Iw supplied corresponds to the current setting signal Is, a pattern of change of the welding current Iw with time is substantially identical with that of the current setting signal Is. Similarly, since the detection signal indicative of the welding voltage Vw corresponds to the welding voltage A/D conversion signal Adv, a pattern of change of the welding voltage Vw with time is substantially identical with the welding voltage A/D conversion signal Adv.

(1) Timings t1 to t2: (Peak Current Supply Time Tp)

As shown by the waveform Is, the current setting signal Is during this time is a peak current setting signal Ip and the peak current Ip is supplied. Also, as shown by the waveform Adv, the welding voltage A/D conversion signal Adv during this time is a peak voltage Vp, the value of which is higher than the voltage setting signal Vs.

As shown by the waveform Vi, the voltage difference integral variable Vi is a calculated value of the first term $\int(Vp-Vs)dt$ of the previously discussed equation (1) and, since Vp>Vs, the calculated value increase with passage of time. As shown by the waveform Pn, the polarity switching signal Pn during this time is 1 (a high level state) and it is therefore the EP polarity. During this time, the EP switching time re-igniting signal Cp and the EN switching time re-igniting signal Cn remain zero (a low level state) as shown by their associated waveforms.

(2) Timings t2 to t3: (EN Current Supply Time Ten)

During this time, the current setting signal Is becomes the EN current setting signal Ien and the EN current Ien is therefore supplied. Also, the welding voltage A/D conversion signal Adv becomes the EN voltage Ven.

With respect to the voltage difference integral variable Vi during this time, the calculated value thereof does not vary since no calculation of the previously described equation (1) is performed. The polarity switching signal Pn during this time is zero (a low level state) and the EN polarity is therefore established. Again, the EP switching time re-igniting signal Cp during this time remains zero (a low level state). On the other hand, the EN switching time re-igniting signal Cn during this time is 1 (a high level state) for a very short length of time immediately after the timing t2 and the re-igniting voltage Vrs is applied during that time.

(3) Timings t3 to t4: (Base Current Supply Time Tb)

During this time, the current setting signal Is becomes the base current setting signal Ib and the base current Ib is therefore supplied. Also, the welding voltage A/D conversion signal Adv becomes a base voltage Vb, the value of which is lower than the voltage setting signal Vs.

With respect to the voltage difference integral variable Vi, it assumes a calculated value of the first term $\int(Vp-Vs)dt$ of the previously described equation (1) during the time span between the timings t1 to t3, added together with the calculated value of the second term $\int(Vp-Vs)dt$ of the previously described equation (1) and, since Vb<Vs, the sum of those calculated values decreases with passage of time. At the timing t4, the sum decreases to substantially zero, at which time the base current supply time Tb terminates.

Again, the polarity switching signal Pn during this time is 1 (a high level state) and the EP polarity is therefore established. The EP switching time re-igniting signal Cp is 1 (a high level state) for a very small length of time immediately after the timing t3 and the re-igniting voltage Vrs is applied. On the other hand, the EN switching time re-igniting signal Cn during this time remains zero (a low level state).

According to the prior art AC pulsed arc welding process discussed hereinbefore, a high voltage re-igniting voltage Vrs is applied so that the arc once extincted can be instantaneously re-ignited at the time of polarity switching. For this reason, no arcing failure which would result from failure to re-ignite at the time of polarity switching will virtually occur.

However, depending on the material used for the workpiece to be welded, the presence or absence of an oxide film on a surface of the workpiece to be welded, the type of a shield gas used, the gas shielded condition and others, an arc interruption often occur a few milliseconds to a few hundreds milliseconds subsequent to the re-ignition of the arcing at the time of polarity switching. This arc interruption subsequent to the re-ignition does in most cases occur during the duration of the base current supply time Tb. Once this arc interruption occurs during the course of welding, weld defects such as, for example, aesthetically poor weld beads, insufficient weld penetration, deposition of relatively large spatters and others will result in. Hereinafter, respective waveforms of the welding current Iw and the welding voltage Vw and the manner of arcing at the time the arc interruption discussed above occurs will now be discussed.

Referring to FIG. 6, there is shown how the welding current Iw and the welding voltage Vw change with passage of time when the arc interruption subsequent to the re-ignition occurs during the duration of the base current supply time Tb.

(1) During the duration of the base current supply time Tb between the timings t1 to t3, no arc interruption subsequent to the re-ignition occur and the AC pulsed arc welding proceeds smoothly.

(2) At the timing t4, the EN polarity is switched over to the EP polarity and the base current supply time Tb starts with the arc of EP polarity re-ignited.

(3) After the timing t5 the base voltage Vb abruptly increases and, at the timing t6, the arc interruption subsequent to the re-ignition occurs.

(4) This arc interruption continues until the timing t7 at which an arc is generated as a result of contact of a free end of the welding wire being fed with the workpiece to be welded.

FIGS. 7A and 7B are schematic diagrams showing the arcing taking place during the duration of the base current supply time Tb. Specifically, FIG. 7A illustrates the arcing during the time span between the timings t1 to t3 with no arc interruption subsequent to the re-ignition occurring, whereas FIG. 7B illustrates the arcing during the time span between the timings t4 to t6 with the arc interruption subsequent to the re-ignition occurring.

(1) Time Span between the Timings t1 to t3

As shown in FIG. 7A, the polarity is switched over to the EP polarity at the timing t1 with the workpiece 2 consequently polarized to a negative pole and, therefore, an arc 3 is re-ignited with a negative point N11 formed on the workpiece 2. The negative point formed on the workpiece has a propensity of being formed at a surface portion of the workpiece where an oxide film exists. On the other hand, since the arcing has a cleaning function of removing the oxide film from the workpiece surface, the oxide film immediately beneath the welding wire 1 has already removed by the cleaning function of the arcing during the course of welding. The extent to which the workpiece surface is cleaned varies depending on the type of material used for the workpiece to be welded, the presence or absence of the oxide film on the workpiece surface, the kind of the shield gas used, the gas shielded condition and others as hereinbefore discussed. It is, however, to be noted that at the timing t1 the negative point N11 is formed substantially immediately beneath the welding wire 1 and the arc 3 is re-ignited. Subsequently, even at the timing t2, a favorable arcing continues. At the timing t3, since the peak current Ip flows, the arc has its width increasing, but the favorable arcing still continues.

(2) Time Span Between Timings t4 to t6

On the other hand, as shown in FIG. 7B, at the timing t4, a negative point N12 is formed at a location spaced a distance X12 (mm) from a point immediately beneath the welding wire where the oxide film has not yet been cleaned, and the arc is re-ignited. Subsequently, up until the timing t5, a surface portion of the workpiece adjacent the negative point N12 is substantially cleaner and, at the timing t5, the negative point shifts a distance X13 further to a point N13, which distance X13 is greater than the distance X12. This shift of the negative point proceeds with passage of time and, therefore, the arc is correspondingly elongated and, finally at the timing t6, the arc can no longer be maintained, resulting in the arc interruption. At this time, the arc length and the welding voltage Vw are in proportional relation to each other and, therefore, increase of the base voltage Vb subsequent to the timing t6 shown in the chart of FIG. 6 corresponds to the above discussed shift of the negative point.

Whether or not the arc interruption that occurs subsequent to the re-ignition such as occurring during the time span between the timings t4 to t6 discussed above depends on the type of material used for the workpiece to be welded, the presence or absence of the oxide film on the workpiece surface, the kind of the shield gas used, the gas shielded condition and others as hereinbefore discussed. By way of example, it has been found that the arc interruption often occurs in the case of the AC pulsed MIG welding in which the workpiece to be welded is made of an aluminum alloy and 100% argon is used for the shield gas, the AC pulsed MIG welding in which the workpiece to be welded is made of an stainless steel and a mixture of 98% argon and 2% oxygen is used for the shield gas, and the AC pulsed MAG welding in which the workpiece to be welded is made of steel and a mixture of 80% argon and 20% carbon dioxide is used for the shield gas. As hereinbefore discussed, once the arc interruption occurs, weld defects such as, for example, aesthetically poor weld beads, insufficient weld penetration, deposition of relatively large spatters and others will result in.

SUMMARY OF THE INVENTION

Accordingly, the present invention has been developed to provide an AC pulsed arc welding method and a welding power supply apparatus which are effective to avoid occurrence of the arc interruption during the course of welding and to thereby provide good welding results of a high quality.

In order to accomplish the foregoing object, the present invention in one aspect provides a method of controlling a consumable electrode AC pulsed arc welding in which a cycle of supplying a peak current sufficient to achieve a droplet transfer during a peak current supply time in an electrode positive polarity in which a welding current is supplied from a welding wire towards a workpiece to be welded, subsequently supplying an electrode negative current sufficient not to achieve the droplet transfer during an electrode negative current supply time in an electrode negative polarity in which the welding current is supplied from the workpiece to be welded towards the welding wire, and finally supplying a base current sufficient not to achieve the droplet transfer during a base current supply time in the electrode positive polarity is repeated. The control method referred to above is featured in that in the event that a re-igniting voltage, which is a base voltage established a predetermined time subsequent to start of the base current supply time, is higher than a sum of a re-igniting base voltage appearing during the previous cycle and a discriminant value of a predetermined re-igniting base voltage, a current of a value higher than the base current is supplied during a period from the timing at which the re-igniting base voltage takes a value higher than the sum to the timing at which the peak current supply time starts.

The present invention in another aspect thereof is featured in that in the event that a re-igniting voltage, which is a base voltage established a predetermined time subsequent to start of the base current supply time is higher than a sum of a re-igniting base voltage appearing during the previous cycle and a discriminant value of a predetermined re-igniting base voltage, the peak current supply time for the subsequent cycle is initiated at the timing at which the re-igniting base voltage takes a value higher than the sum to thereby supply the peak current.

The present invention in a further aspect thereof is featured in that in the event that the rate of increase of the base voltage during the base current supply time is higher than the predetermined discriminant value, the current of a value higher than the base current is supplied during a period from the timing at which the rate of increase attains a value higher than the predetermined discriminant value to the timing at which the peak current supply time starts.

The present invention in a yet further aspect thereof is featured in that in the event that the rate of increase of the base voltage during the base current supply time is higher than the predetermined discriminant value, the peak current supply time for the subsequent cycle is initiated from the timing at which the rate of increase attains a value higher than the predetermined discriminant value to thereby supply the peak current.

BRIEF DESCRIPTION OF THE DRAWINGS

The present invention will become readily understood from the following description of preferred embodiments thereof made with reference to the accompanying drawings, in which like parts are designated by like reference numeral and in which:

FIG. 19 is a flow chart showing the Tb control subroutine used in conjunction with the fourth embodiment of the control method;

FIG. 23 is a diagram showing how the control method of the present invention is superior to the prior art control method when AC pulsed arc welding is effected to a workpiece made of mild steel.

DESCRIPTION OF THE EMBODIMENTS

According to an exemplary embodiment of the present invention, as shown in FIGS. 12 to 19 (Embodiment 4), there is provided a welding power supply apparatus for the AC pulsed arc welding, of a design in which a cycle of supplying a peak current Ip sufficient to achieve a droplet transfer during a peak current supply time Tp in an electrode positive polarity in which a welding current Iw is supplied from a welding wire towards a workpiece to be welded, subsequently supplying an electrode negative current Ien sufficient not to achieve the droplet transfer during an electrode negative current supply time Ten in an electrode negative polarity in which the welding current Iw is supplied from the workpiece to be welded towards the welding wire, and finally supplying a base current Ib sufficient not to achieve the droplet transfer during a base current supply time Tb in the electrode positive polarity is repeated. The welding power supply apparatus of the design described above includes:

an arc interruption preventive current setting circuit IC for setting an arc interruption preventive current Ic of a value higher than the base current Ib; and a current waveform control circuit WC including a step of detecting the rate of increase dVb/dt of the base voltage during the base current supply time Tb, a step of determining whether or not the detected rate of increase is higher than a predetermined base voltage increase rate determining value ΔVu, and a step of initiating the peak current supply time Tp for the subsequent cycle when a result of determination indicates "YES", to thereby output a current setting signal Is corresponding to the peak current Ip, so that the supply of the welding current Iw is controlled by the current setting signal Is to thereby avoid the arc interruption.

Figure 8:
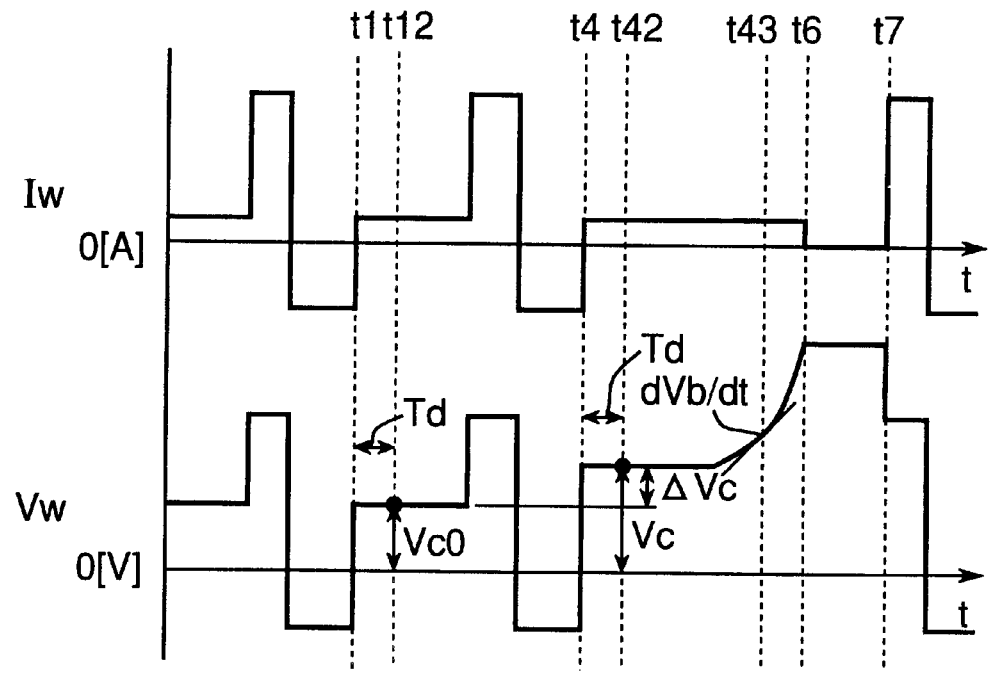
FIG. 8 is a chart showing changes in welding current and voltage with time occurring during the performance of an AC pulsed arc welding, which chart is used to explain a first arc interruption preventing method that is used in the practice of a method of controlling the AC pulsed arc welding according to the present invention.

FIG. 8 is a chart illustrative of changes in welding current and voltage Iw and Vw with time, which are shown in timed relation with each other. The chart shown in FIG. 8 is substantially identical with that shown in FIG. 6, but annotations are added to illustrate two alternative arc interruption preventing methods that can be used in the practice of the method of controlling the AC pulsed arc welding according to the present invention. Each of those arc interruption preventing methods will first be described with reference to FIG. 8.

[First Arc Interruption Preventive Method]

Figure 6:
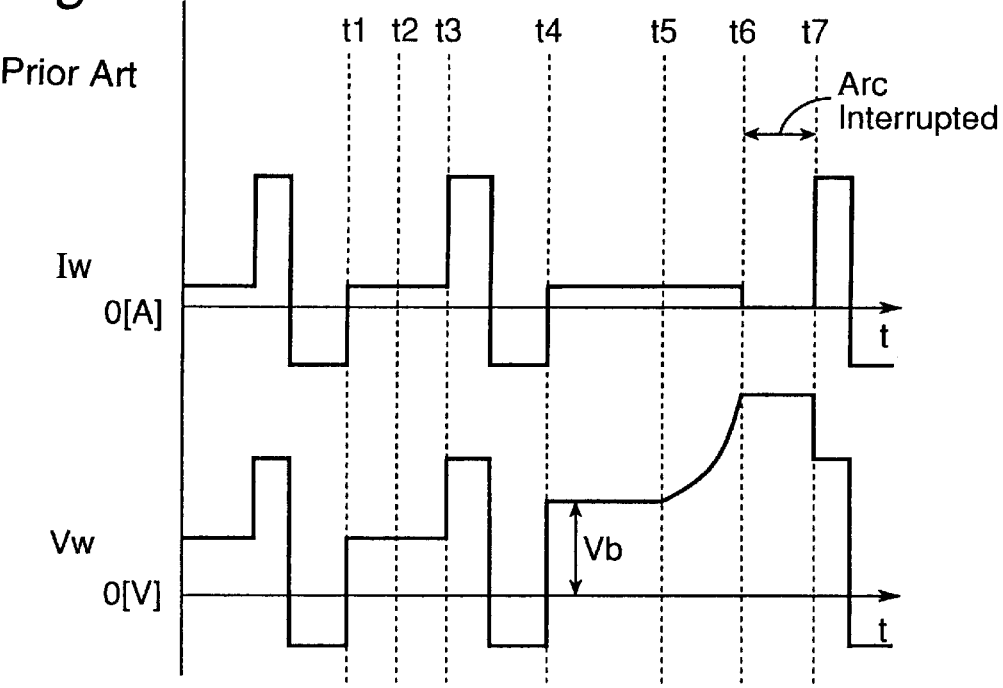
FIG. 6 is a chart showing changes in welding current and voltage with time shown when during the performance of the prior art AC pulsed arc welding, an arc interruption occurs.

(1) As discussed under (1) of the description made with reference to FIG. 6, the polarity is switched over to the EP polarity at the timing t1 and the arc is re-ignited. Subsequently, at the timing t12 a predetermined detection wait time Td [s] after the re-ignition, a re-igniting base voltage Vc [V] is detected and is stored as a previous reigniting base voltage Vc0. The detection wait time Td is preset to a value within the range of a few hundreds microseconds to a few milliseconds.

Figure 7A:
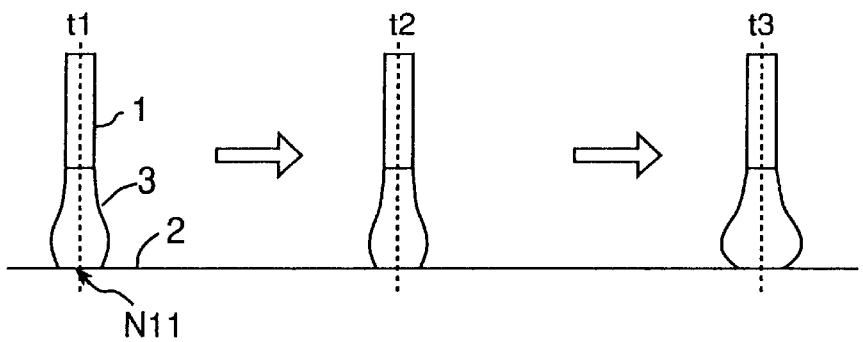
FIGS. 7A and 7B are schematic diagrams showing the arcing during different time spans during a base current supply time, respectively.
Figure 7B:
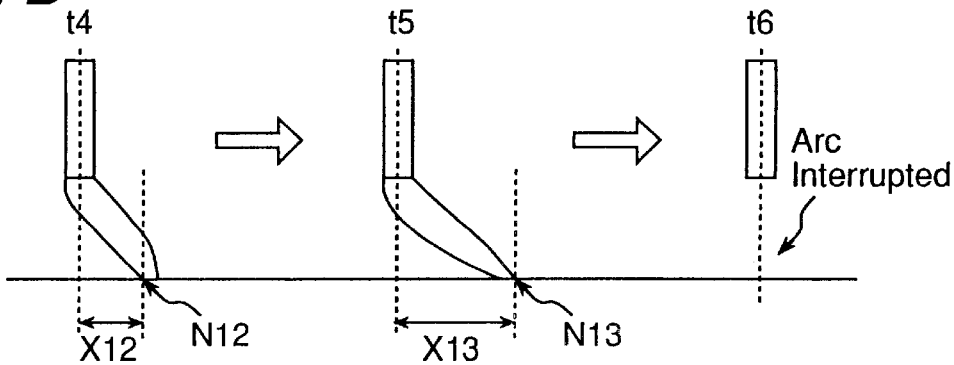

(2) As discussed under (2) of the description made with reference to FIG. 6, the polarity is switched over to the EP polarity at the timing t4, the negative point N12 shown in FIG. 7 is formed on the workpiece surface with the arc re-ignited. Subsequently, at the timing t42 after the predetermined detection wait time Td, the re-igniting base voltage Vc [V] is detected.

(3) As described above, since the arc at the timing t42 has an arc length greater than that at the timing t12, Vc0<Vc. In view of this, the first arc interruption preventing method makes use of a detection criteria at which the re-igniting base voltage Vc exceeds the sum of the previous re-igniting base voltage Vc0 and the predetermined re-igniting base voltage determining value ΔVc, so that the arc interruption which would occur after the re-ignition can be anticipatorily detected.

Although in the foregoing arc interruption preventing method for the previous re-igniting base voltage Vc0 the value detected at the time of EP polarity switching during the previous cycle, an average value of few to some tens detected values may be used as the previous re-igniting base voltage Vc0. Also, the reason for the detection of the re-igniting base voltage Vc the predetermined detection wait time Tb after the EP polarity switching is because an accurate re-igniting base voltage Vc that has assumed a stabilized state subsequent to settlement of a transit condition incident to the EP polarity switching.

[Second Arc Interruption Preventive Method]

(1) As discussed under item (2) of the description made with reference to FIG. 6, the polarity is switched over to the EP polarity at the timing t4 with the arc re-ignited. Subsequently, since the negative point shifts to a distant point as hereinbefore discussed, the arc is elongated and, as a result thereof, the base voltage Vb increases. In view of this, the second arc interruption preventing method makes use of a detection criteria at which the base voltage increase rate dVb/dt detected during the base voltage supply time Tb subsequent to the timing t4 exceeds the predetermined base voltage increase rate determining value ΔVu, so that the arc interruption which would occur after the re-ignition can be anticipatorily detected.

[Overview of the Invention]

The basic structure of the present invention is that, in the consumable electrode AC pulsed arc welding method and apparatus wherein a cycle of supplying a peak current Ip sufficient to achieve a droplet transfer during a peak current supply time Tp in an electrode positive polarity in which a welding current Iw is supplied from a welding wire towards a workpiece to be welded, subsequently supplying an electrode negative current Ien sufficient not to achieve the droplet transfer during an electrode negative current supply time Ten in an electrode negative polarity in which the welding current Iw is supplied from the workpiece to be welded towards the welding wire, and finally supplying a base current Ib sufficient not to achieve the droplet transfer during a base current supply time Tb in the electrode positive polarity is repeated, detection is initiated a predetermined time subsequent to the supply of the base current Ib and, after the value detected from the base voltage exceeds a predetermined discriminant value, the current of a value higher than the base current Ib is supplied.

In the practice of the first arc interruption preventing method shown in FIG. 8 as will be described later, the term "value detected from the base voltage" referred to hereinabove and hereinafter stands for the re-igniting base voltage Vc of the base voltage Vb, and the predetermined discriminant value stands for a value of the previous detected value Vc0, that is detected of the base voltage Vb during the previous cycle in which no arc is interrupted, added with a predetermined re-igniting base voltage determining constant ΔVc.

In the practice of the second arc interruption preventing method, the term "value detected from the base voltage" referred to hereinabove and hereinafter stands for the base voltage increase rate dVb/dt calculated during the base current supply time Tb and the predetermined discriminant value stands for the base voltage increase rate determining value ΔVu.

Figure 9:
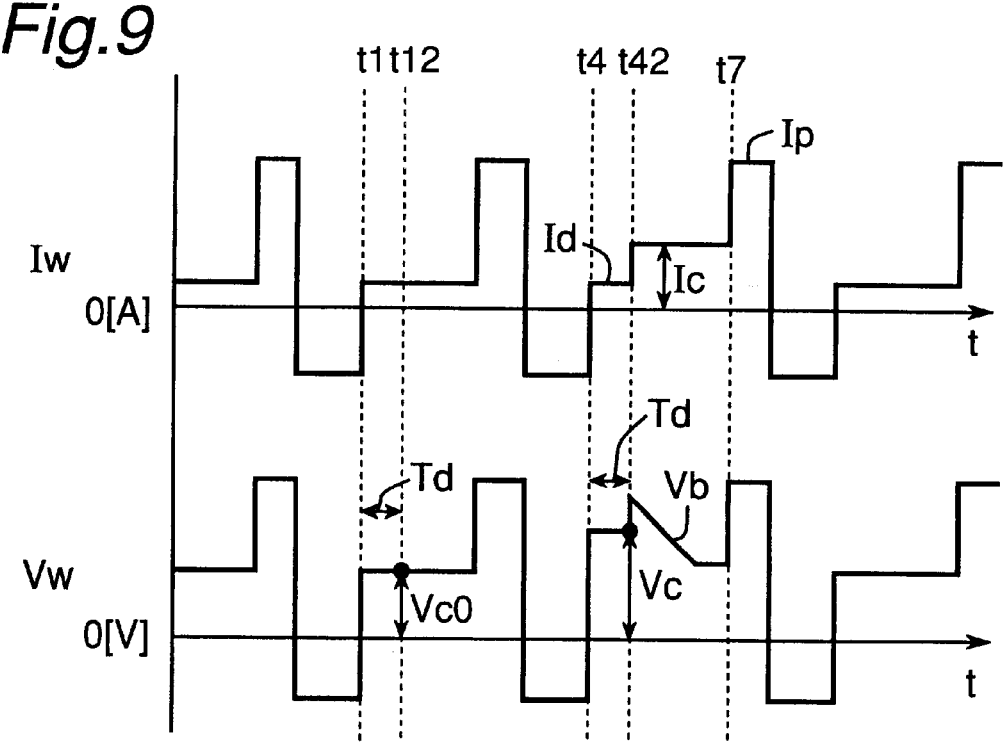
FIG. 9 is a chart similar to FIG. 8, showing a first preferred embodiment of the method of controlling the AC pulsed arc welding in which the first arc interruption preventing method is employed.
Figure 16:
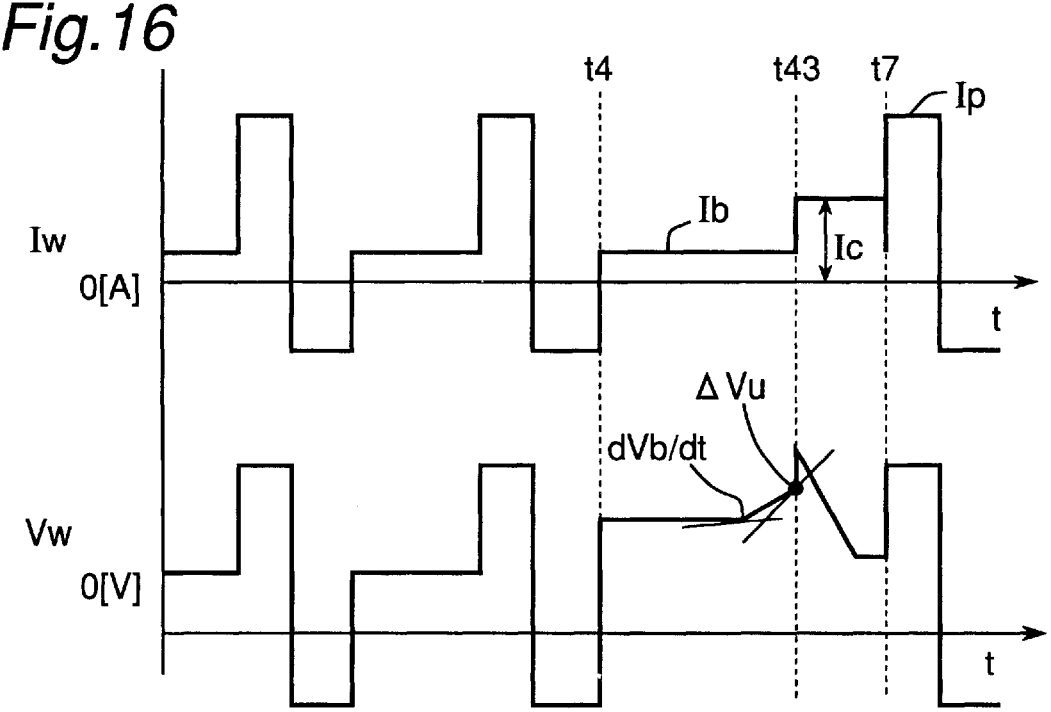
FIG. 16 is a chart similar to FIG. 8, showing a third preferred embodiment of the method of controlling the AC pulsed arc welding in which a second arc interruption preventing method is employed.

The term "current of a value higher than the base current Ib" referred to hereinabove and hereinafter stands for the "arc interruption preventive current Ic" that is set to a value higher than the base current Ib, in place of the base current Ib, during a period from the timing at which the value detected from the base voltage exceeds the predetermined discriminant value to the timing at which the peak current supply time Tp for the subsequent cycle starts, as shown in FIGS. 9 and 16 as will be described later.

Figure 14:
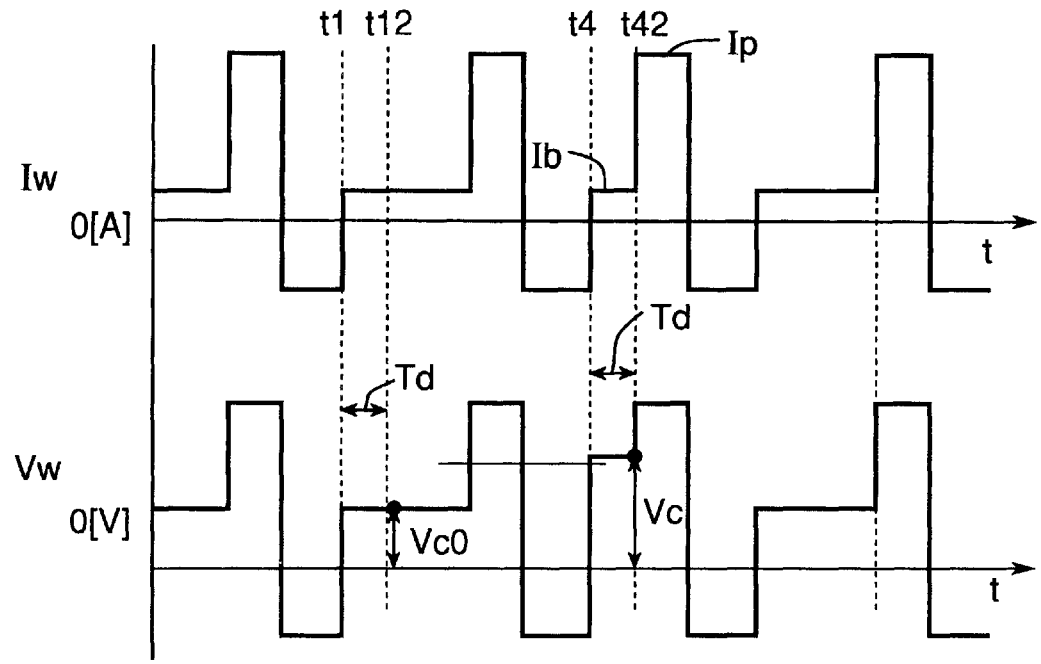
FIG. 14 is a chart similar to FIG. 8, showing a second preferred embodiment of the method of controlling the AC pulsed arc welding in which the first arc interruption preventing method is employed.
Figure 18:
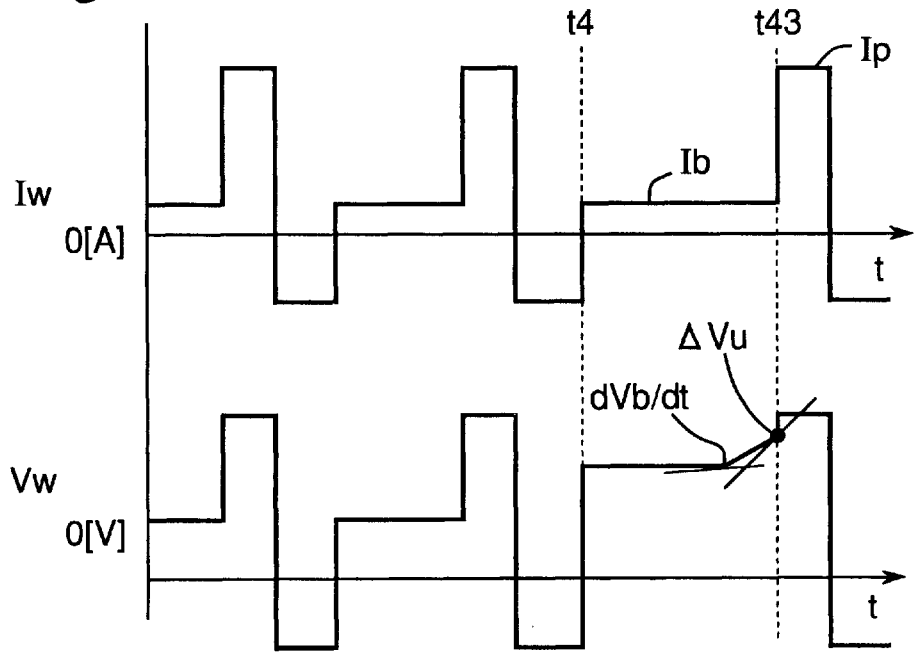
FIG. 18 is a chart similar to FIG. 8, showing a fourth preferred embodiment of the method of controlling the AC pulsed arc welding in which the second arc interruption preventing method is employed.

Also, the term "current of a value higher than the base current Ib" referred to hereinabove and hereinafter stands for the "peak current Ip" in which the current of a value higher than the base current Ib initiates the peak current supply time Tp for the subsequent cycle from such timing, as shown in FIGS. 14 and 18 as will be described.

Figure 13:
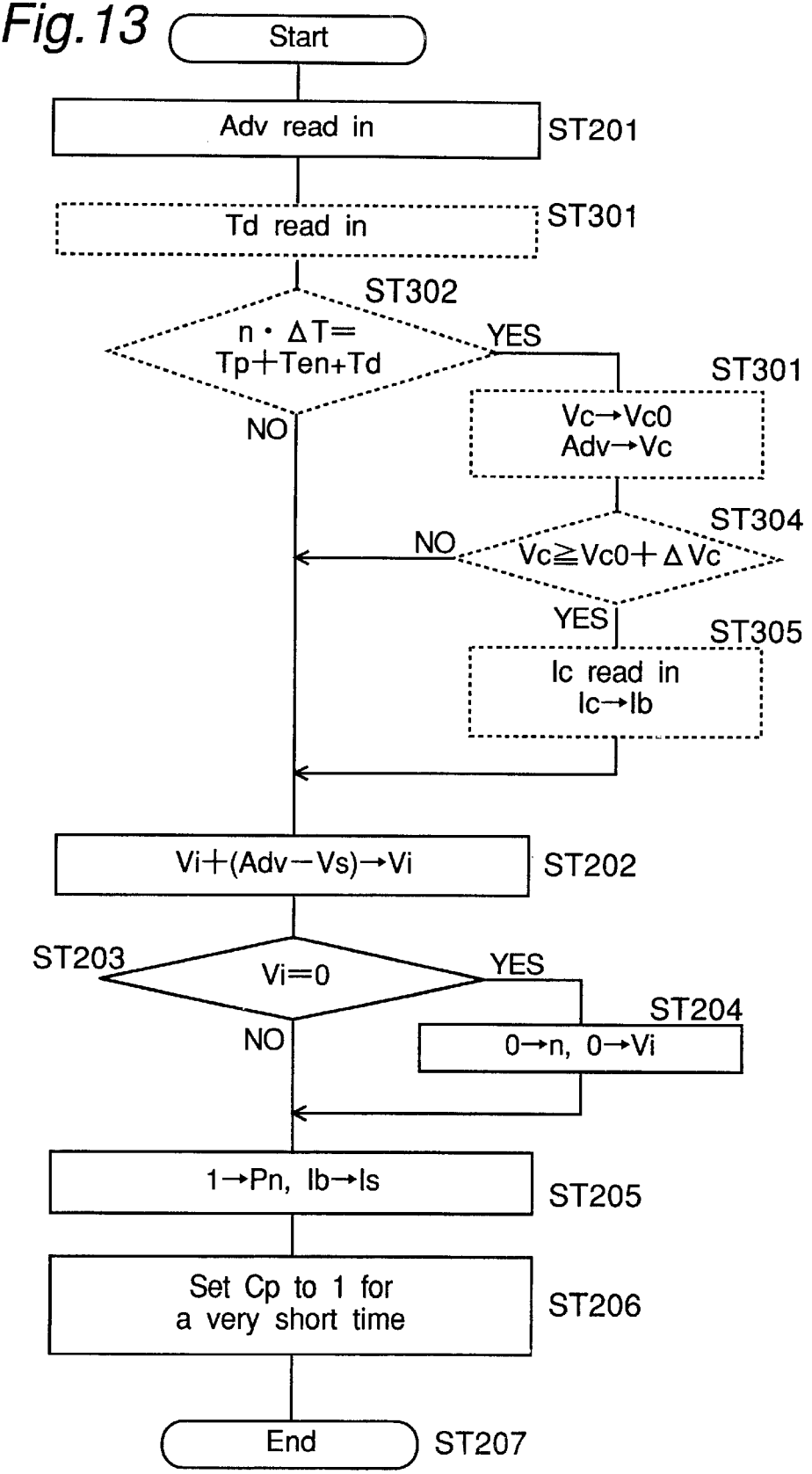
FIG. 13 is a flow chart showing a Tb control subroutine used in conjunction with the first embodiment of the control method.
Figure 15:
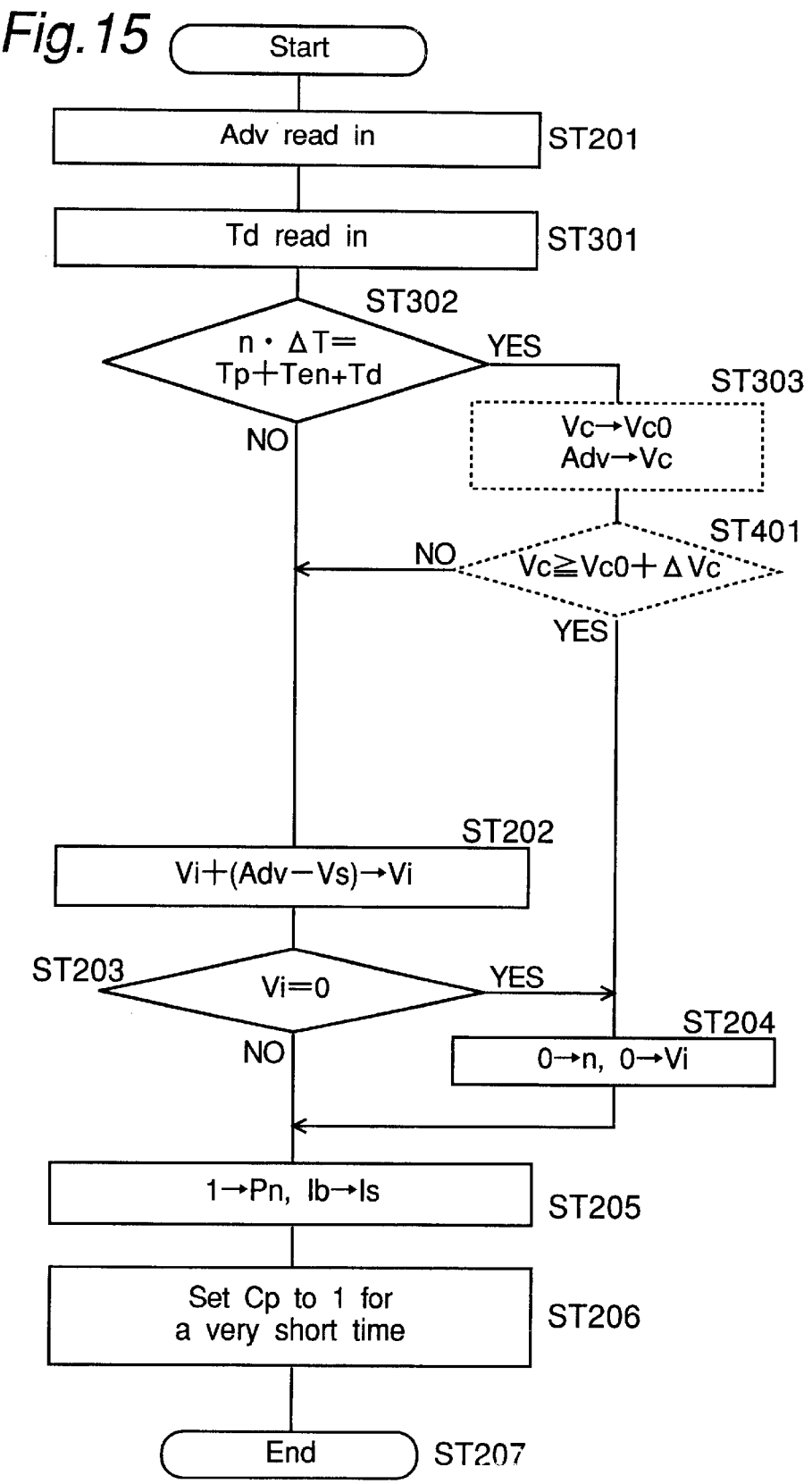
FIG. 15 is a flow chart showing the Tb control subroutine used in conjunction with the second embodiment of the control method.
Figure 17:
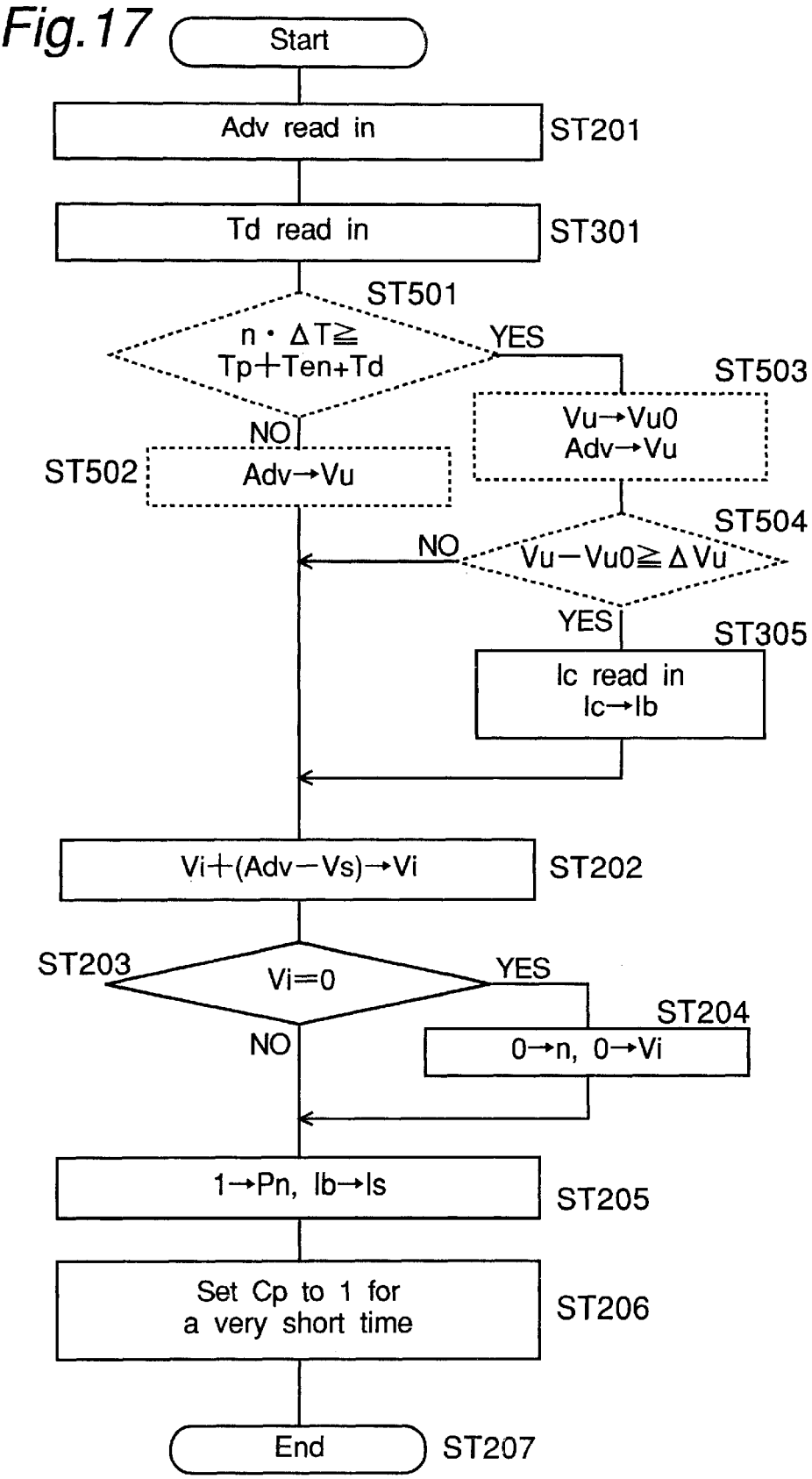
FIG. 17 is a flow chart showing the Tb control subroutine used in conjunction with the third embodiment of the control method.

Hereinafter, some embodiments, Embodiments 1 to 4, representative of the basic structure of the present invention will be described. Specifically, the first embodiment, Embodiment 1, of the present invention pertains to a combined use of the first arc interruption preventing method and the arc interruption preventive current Ic as shown in FIGS. 9 and 13; the second embodiment, Embodiment 2, thereof pertains to a combined use of the first arc interruption preventing method and the peak current Ip as shown in FIGS. 14 and 15; the third embodiment, Embodiment 3, thereof pertains to a combined use of the second arc interruption preventing method and the arc interruption preventive current Ic as shown in FIGS. 16 and 17; and the third embodiment, Embodiment 3, thereof pertains to a combined use of the second arc interruption preventing method and the peak current Ip.

[Embodiment 1]

Referring now to FIG. 9, there is shown a chart showing changes in welding current and voltage with time occurring during the performance of an AC pulsed arc welding according to the first embodiment of the present invention in which the first arc interruption preventing method is employed. In this figure, at the timing t42, in the event of Vc≧Vc0+ΔVc determined by the first arc interruption preventing method described with reference to FIG. 8, a predetermined arc interruption preventive current Ic of a value higher than the base current Ib is supplied. As a result of the supply of this arc interruption preventive current Ic, the arc is pulled to a normal course with its longitudinal axis aligned with a direction of feed of the welding wire the negative point by the reason as will be described subsequently with reference to FIG. 10 and the negative point once formed at a distant location is newly formed at a location immediately beneath the welding wire. Accordingly, subsequent to the timing t42, the base voltage Vb drops and no arc interruption occur. Thereafter, at the timing t7, the peak current Ip is supplied with the arcing maintained in a favorable state. The arc interruption preventive current Ic is chosen to be a proper value in consideration of the type of material used for the workpiece to be welded, the average welding current, the kind of the shield gas used, and others as hereinbefore discussed. It is, however, to be noted that the predetermined value for the arc interruption preventive current Ic has to be higher than the base current Ib and may also be higher than the peak current Ip.

Figure 10:
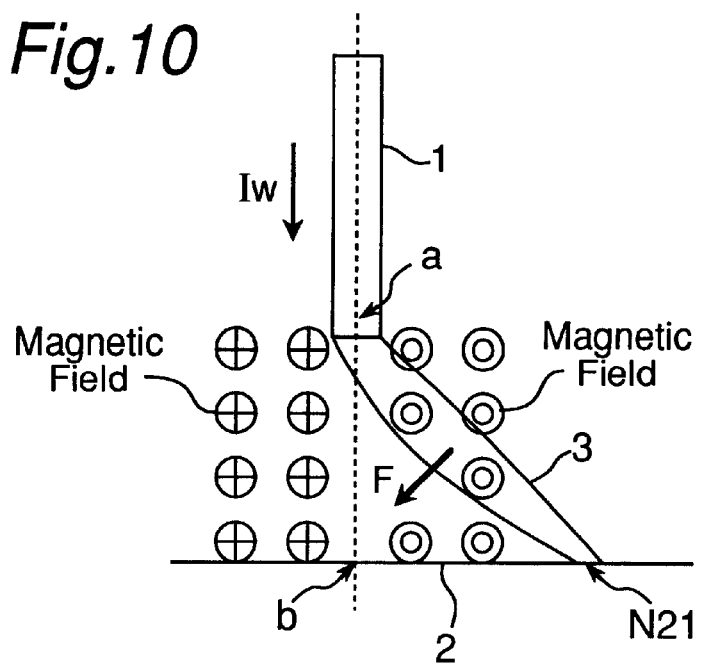
FIG. 10 is a schematic diagram showing how the arc once shifted laterally from a normal course is pulled towards a negative point that is formed on the workpiece to be welded immediately beneath a welding torch to assume the normal course as a result of application of an arc interruption preventive current.

FIG. 10 illustrates the condition of the arc developed at the timing t42 of the chart of FIG. 9, showing how the arc once shifted laterally from the normal course is pulled towards the negative point that is formed on the workpiece to be welded immediately beneath a welding torch to assume the normal course as a result of application of an arc interruption preventive current.

As shown in FIG. 10, with the welding current Iw flowing the welding wire 1 towards the workpiece 2 to be welded, the arc 3 is developed between the tip of the welding wire 1 and the negative point N21 formed on the workpiece 2. By the effect of the welding current Iw flowing through the arc 3, a magnetic field is developed as shown in FIG. 10. At this time, since the arc 3 is shifted from the normal course in a direction (a–N21) laterally rightwards as viewed therein, a force F tending to pull the arc 3 in a direction (a–b) towards the normal course acts. The property of the arc being pulled in a direction required to assume the normal course is referred to as an arc rigidity. In general, the larger the angle of inclination of the arc, the stronger the arc rigidity. Also, the higher the current flowing, the stronger the arc rigidity.

Accordingly, starting from the condition in which the arc is inclined considerably with respect to the normal course as shown in FIG. 10, the supply of the arc interruption preventive current Ic of a relatively high value increases the arc rigidity with the arc consequently pulled back to the normal course (a–b).

Figure 11:
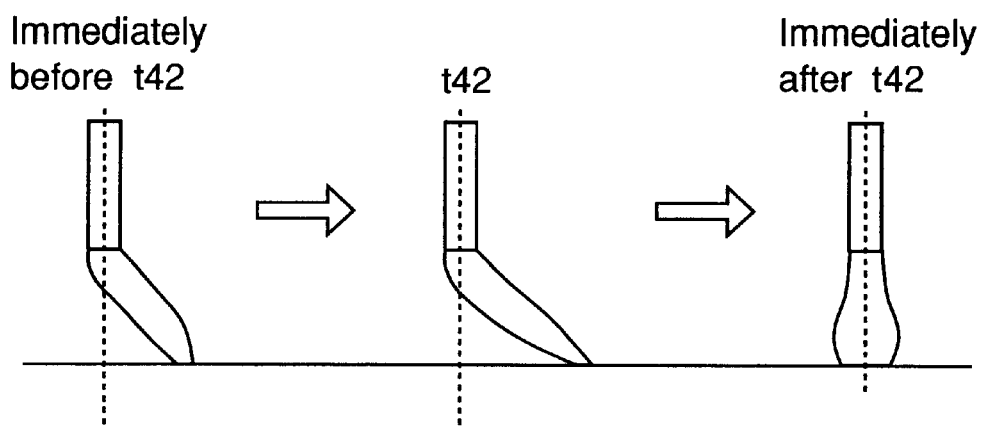
FIG. 11 is a schematic diagram showing how the arc restores to the normal course when the arc interruption preventive current is applied during the execution of the first embodiment of the control method shown in FIG. 9.

FIG. 11 illustrates arcing conditions occurring about the timing t42 at which the arc interruption preventive current Ic is supplied during the execution of the AC pulsed arc welding control method of the present invention as discussed with reference to FIG. 9. As shown therein, immediately before the timing t42, the arc is considerably inclined. At the timing t42, when the arc interruption preventive current Ic is supplied, the arc rigidity discussed hereinabove increases, causing the arc to be pulled back towards the normal course and, therefore, immediately after the timing t42, the negative point is newly formed at a location immediately beneath the welding wire thereby allowing the arcing to take place continuously without being interrupted subsequent to the re-ignition.

Figure 1:
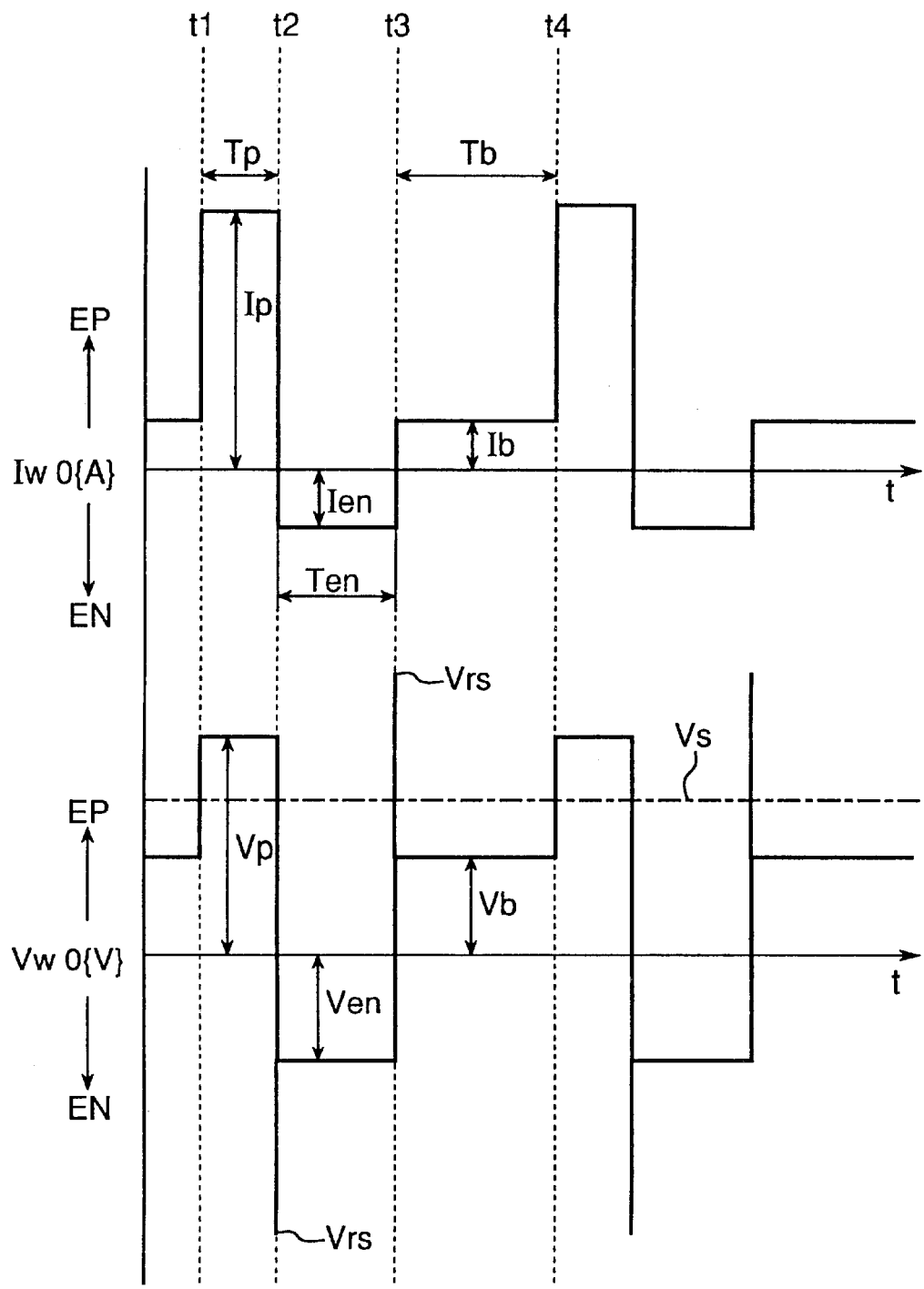
FIG. 1 is a chart showing changes in welding current and voltage with time occurring during the performance of the prior art AC pulsed arc welding.
Figure 2:
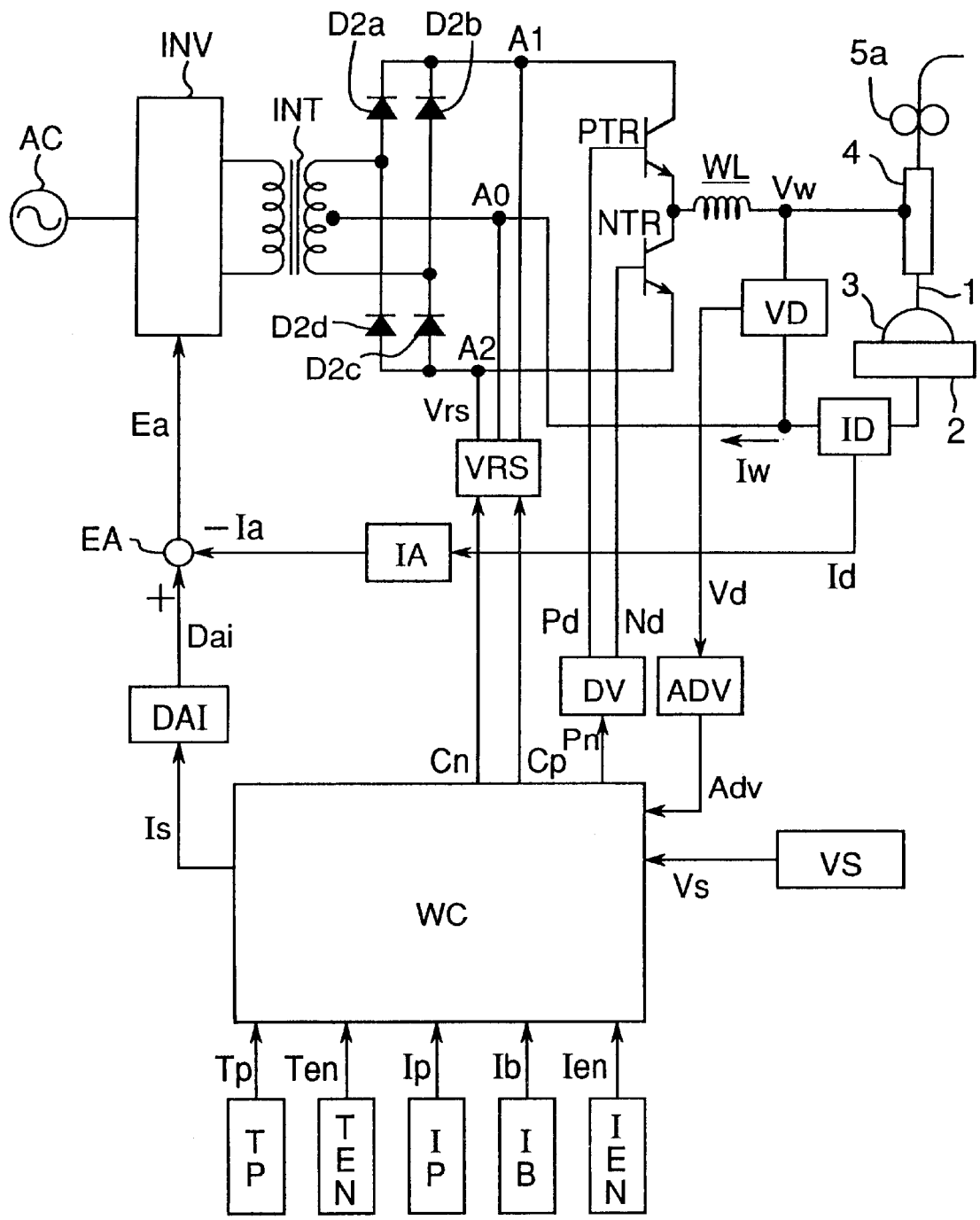
FIG. 2 is a block diagram showing a welding power supply apparatus used in conjunction with the prior art AC pulsed arc welding.
Figure 12:
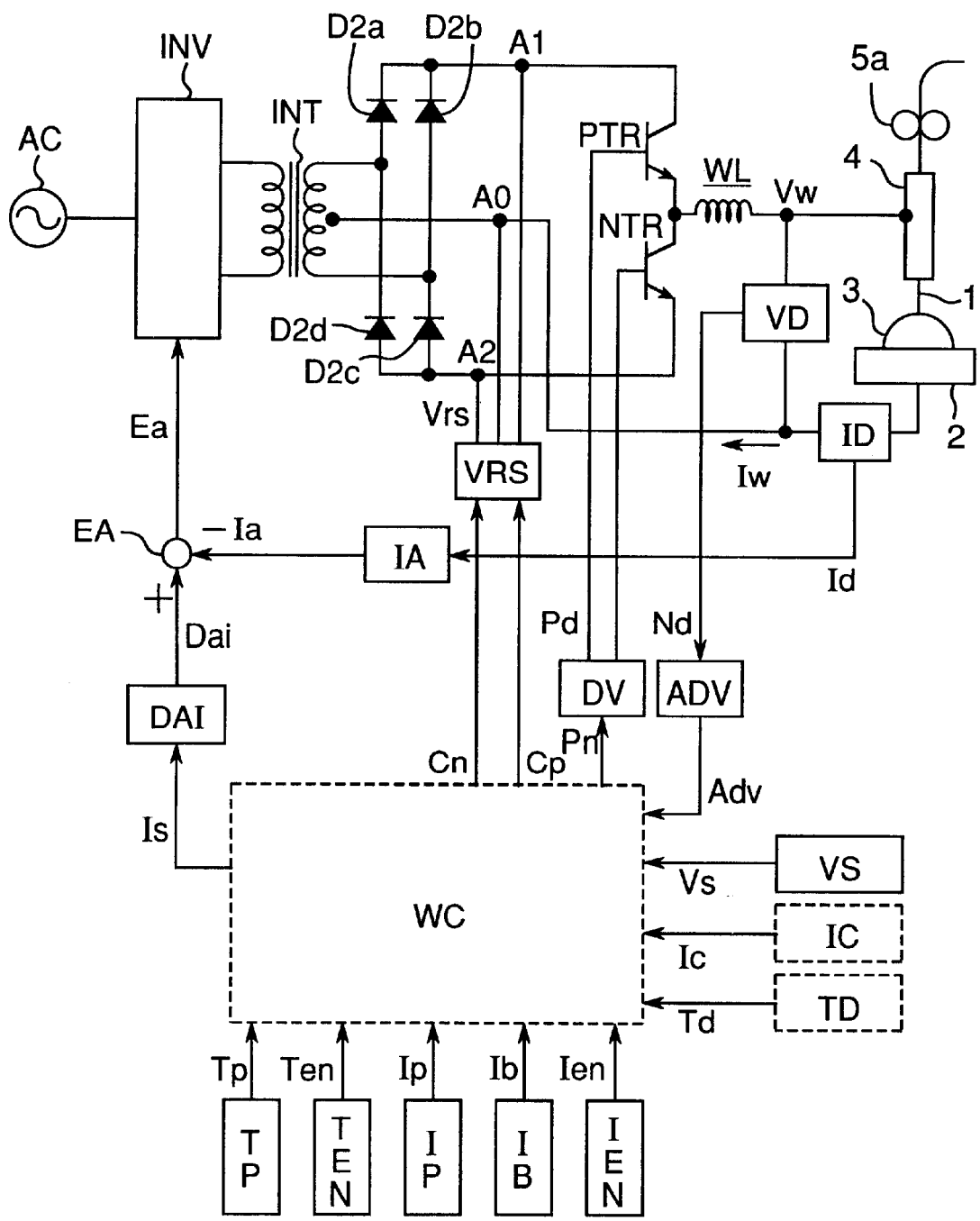
FIG. 12 is a block diagram showing a welding power supply apparatus employed to perform the first embodiment of the control method shown in FIG. 9.

FIG. 12 illustrates a block diagram of the welding power supply apparatus used in conjunction with the AC pulsed arc welding control method according to the first embodiment discussed with reference to FIG. 9. The welding power supply apparatus shown therein is substantially similar to the prior art welding power supply apparatus shown in FIG. 2, except that in the practice of the present invention an arc interruption current setting circuit IC and a detection wait time setting circuit TD are additionally employed and are connected with the current waveform control circuit WC which therefore functions in a manner different from that employed in the prior arc welding power supply apparatus.

Referring to FIG. 12, the arc interruption preventive current setting circuit IC outputs an arc interruption preventive current setting signal Ic to the current waveform control circuit WC. The detection wait time setting circuit TD outputs a detection wait time setting signal Td to the current waveform control circuit WC.

The current waveform control circuit WC receives the welding voltage A/D conversion signal Adv, the voltage setting signal Vs, the peak current setting signal Ip, the base current setting signal Ib, the EN current setting signal Ien, the arc interruption preventive current setting signal Ic and the detection wait time setting signal Td and processes them by the utilization of a software to provide a current setting signal Is, a polarity switching signal Pn, an EP switching time re-igniting signal Cp and an EN switching time re-igniting signal Cn. The details of the software used are different from that used in the prior art apparatus discussed with reference to FIGS. 3 and 4 and will be described later with reference to FIG. 13.

Figure 3:
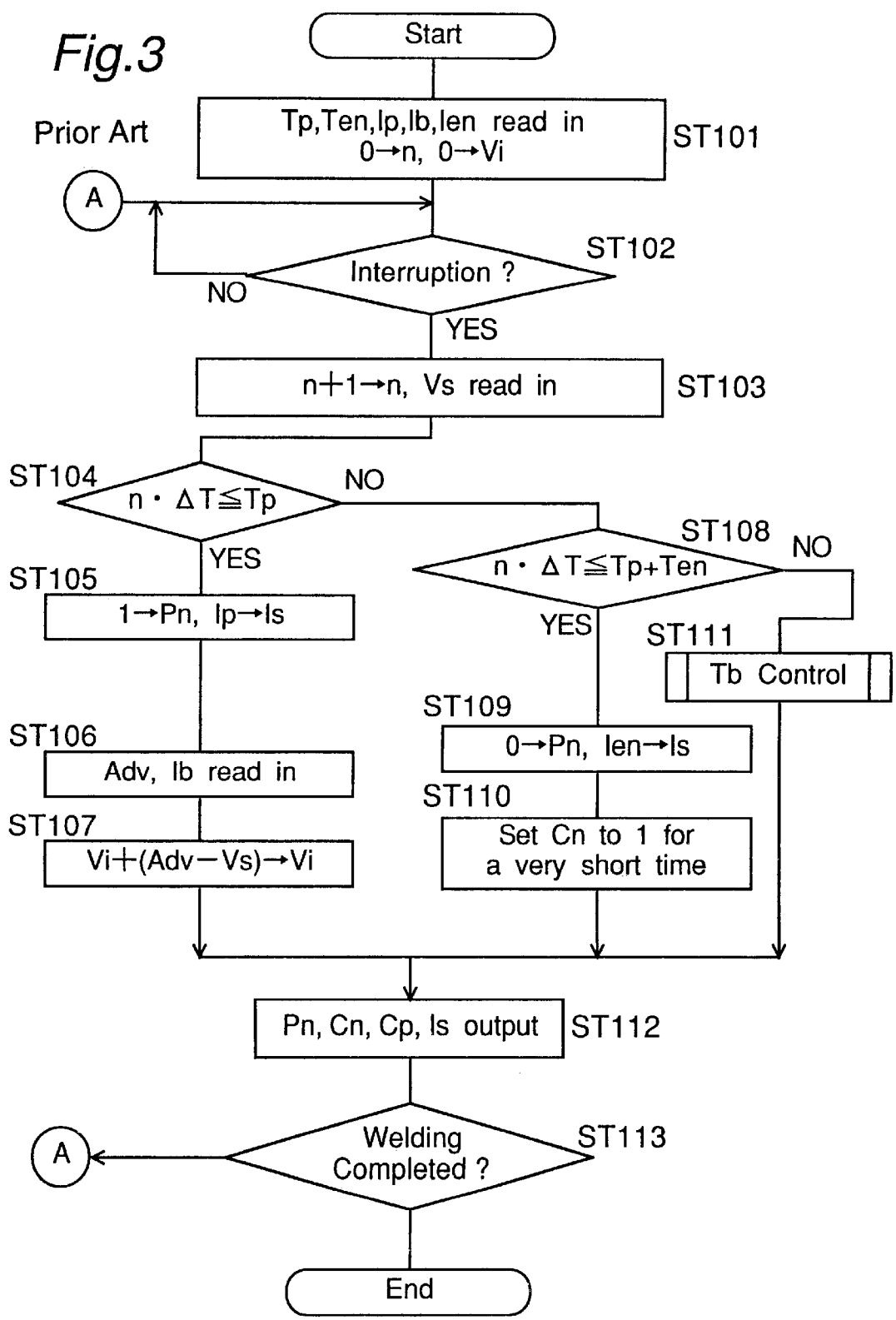
FIG. 3 is a flow chart showing a software process executed by a current waveform control circuit employed in the prior art apparatus.
Figure 4:
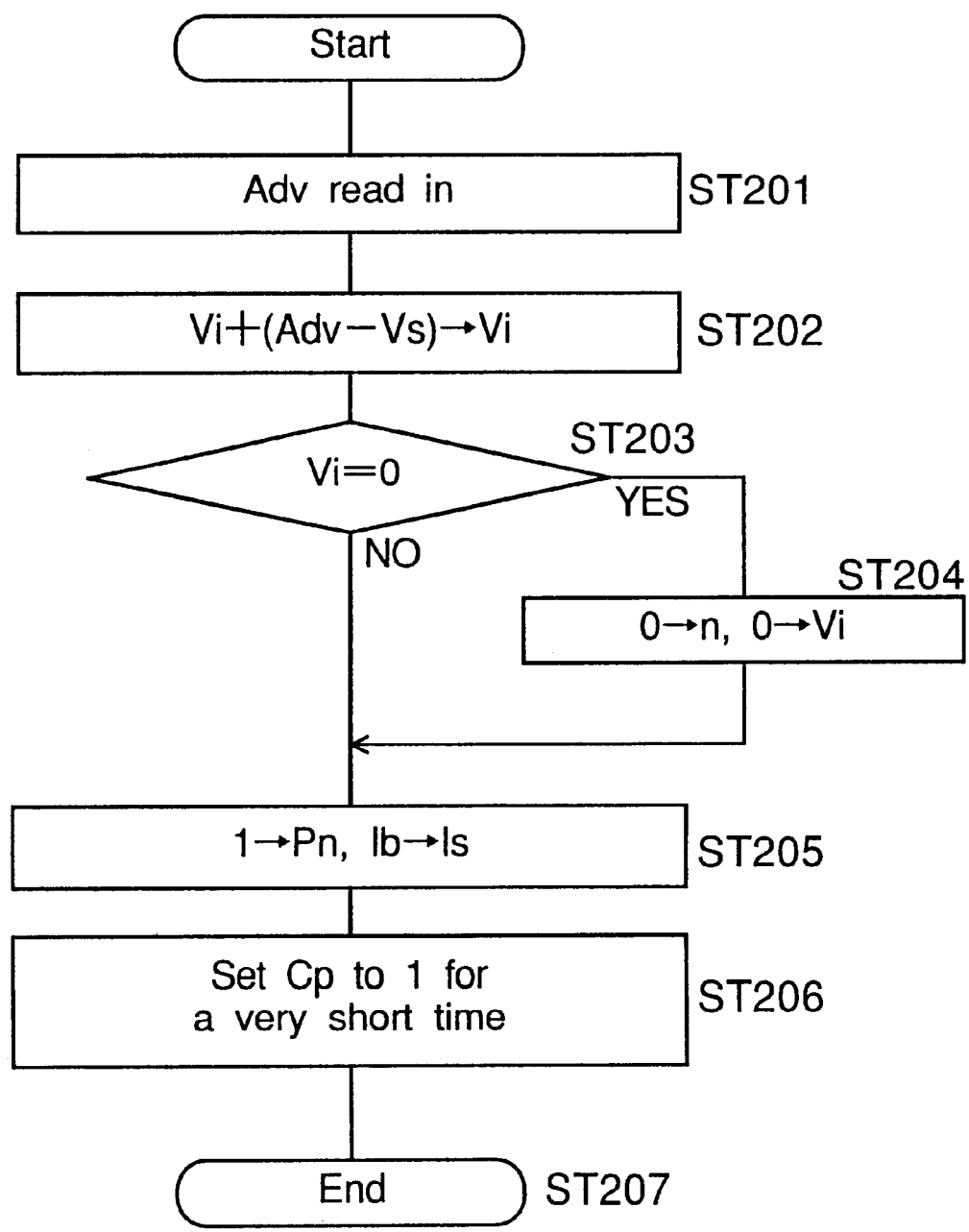
FIG. 4 is a flow chart showing a base current supply time (Tb) control subroutine forming a part of the software process shown in FIG. 3.
Figure 5:
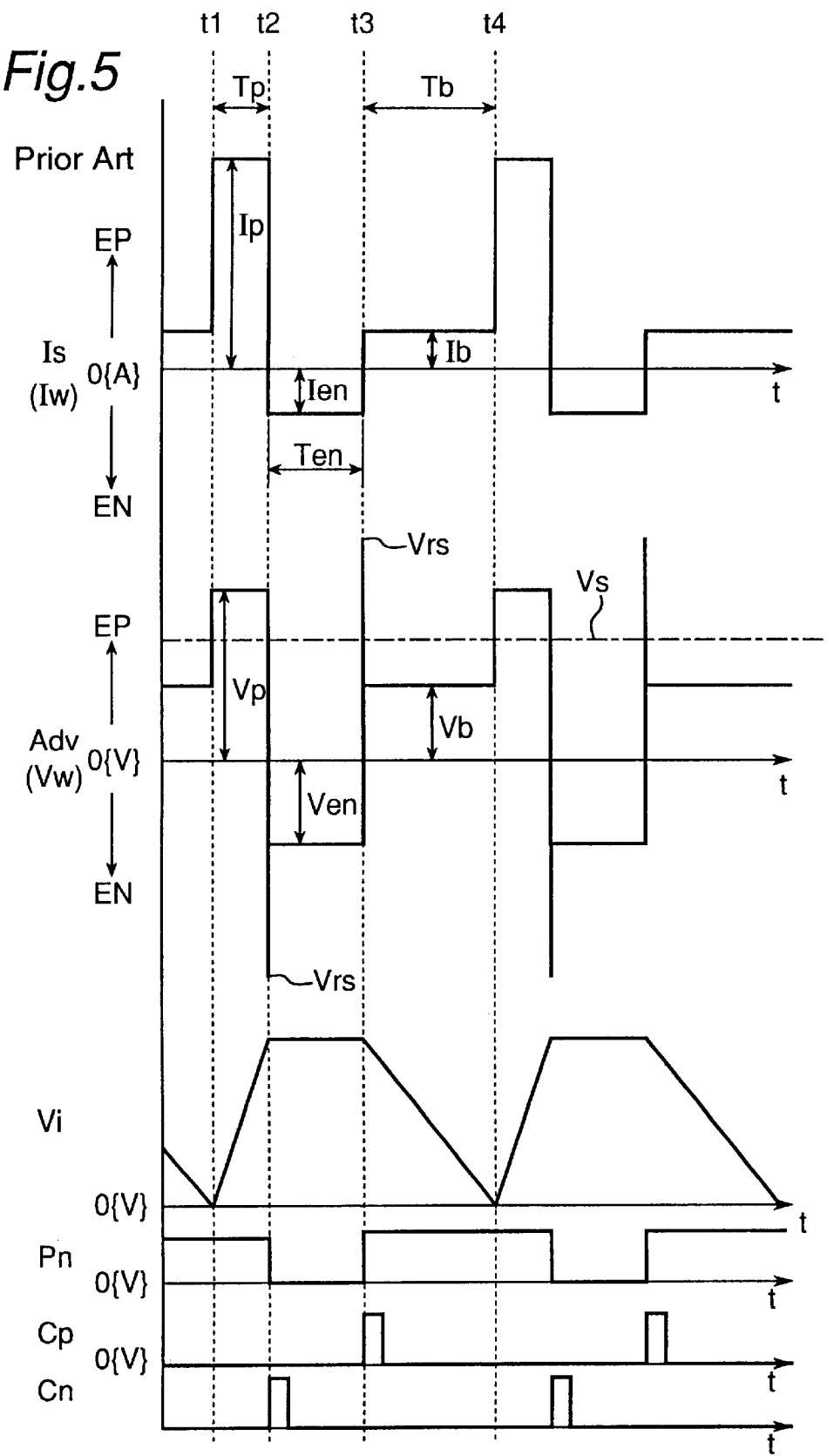
FIG. 5 is a timing chart showing various waveforms of signals appearing in the welding power supply apparatus used in conjunction with the prior art AC pulsed arc welding shown in FIGS. 2 to 4.

The software processing performed by the current waveform control circuit WC employed in the first embodiment is substantially similar to that used in the prior art apparatus which have been described with reference to FIG. 3, except for the Tb control subroutine. Accordingly, in the following description, only a portion of the Tb control subroutine that differs from that shown in FIG. 4 and that is performed by the current waveform control circuit WC employed in the first embodiment will be described. Note that blocks of steps ST301 to ST305 shown by the dotted lines in FIG. 13 are those added uniquely according to the present invention and are not employed in the subroutine shown in FIG. 4.

Referring now to FIG. 13, at step ST301, the detection wait time setting signal Td is read from an external circuit into the software, followed by a decision step ST 302. At step ST302, a decision is made to determine if the product of the waveform counter variable n multiplied by the interruption time ΔT is equal to the sum of the peak current supply time setting signal Tp, the EN current supply time setting signal Ten and the detection wait time setting signal Td, and if it is "YES", the program flow goes to step ST303, but if it is "NO", the program flow goes to step ST202. It is to be noted that the decision step ST302 is to determine if it is the timing that occurs a detection wait time Td subsequent to the timing of the EP polarity switching.

At step ST303, the re-igniting base voltage variable Vc is substituted for the previous re-igniting base voltage variable Vc0. At the same time, the welding voltage A/D conversion signal Adv read in at step ST201 is also substituted for the re-igniting base voltage variable Vc. The re-igniting base voltage variable Vc and the previous re-igniting base voltage variable Vc0 are those used by the software and an initial value of the re-igniting base voltage Vc is preset beforehand.

At step ST304, a decision is made to determine if the re-igniting base voltage variable Vc is equal to or larger than the sum of the previous re-igniting base variable Vc0 and the predetermined re-igniting base voltage determining constant ΔVc, and if it is "YES", the program flow goes to step ST305, but if it is "NO", the program flow goes to step ST202. It is to be noted that the decision step ST304 is such that an anticipatory determination of a possible occurrence of the arc interruption according to the first arc interruption preventing method is performed. It is also to be noted that the re-igniting base voltage determining constant ΔVc is a constant used in the software.

At step ST305, the arc interruption preventive current setting signal Ic is read from an external circuit into the software and is then substituted for the base current setting signal Ib. By the process of this step ST305, the arc interruption preventive current Ic flows in the event that the possible occurrence of the arc interruption is detected (i.e., in the event that a result of decision at step ST304 is "YES").

[Embodiment 2]

FIG. 14 illustrates a chart showing changes in welding current and voltage with time occurring during the performance of an AC pulsed arc welding according to the second embodiment of the present invention in which the first arc interruption preventing method is employed.

In this figure, at the timing t42, in the event of $Vc \geq Vc0 + \Delta Vc$ determined by the first arc interruption preventing method described with reference to FIG. 8, the peak current Ip which is a value higher than the base current Ib flows. The timing at which the peak current Ip is supplied is determined by the Tb control based on the previously discussed equation (1), but when the arc interruption is anticipatorily detected, the peak current Ip is forcibly supplied regardless of the Tb control. Since once the peak current Ip is supplied, the arc rigidity increases as described hereinbefore with the arc consequently pulled towards the normal course, the negative point is newly formed at a location immediately beneath the welding wire and, hence, a favorable arcing continues without accompanied by the arc interruption subsequent to the re-ignition. Respective specific values of the peak current Ip and the peak current supply time Tp at the time the arc interruption is anticipatorily detected may be different from those employed when no arc interruption is anticipatorily detected.

The welding power supply apparatus used in the practice of the second embodiment of the AC pulsed arc welding control method may be similar to that shown in FIG. 12, except that the software processing performed by the current waveform control circuit WC. The software processing performed by the current waveform control circuit WC in the practice of the second embodiment of the present invention is shown in FIG. 15. Accordingly, in the following description, only a portion of the Tb control subroutine that differs from that shown in FIG. 13 will be described. Note that a block of step ST401 shown by the dotted lines in FIG. 15 is that added uniquely and not employed in the subroutine shown in FIG. 13.

Referring to FIG. 15, at step ST401, a decision is made to determine if the re-igniting base voltage variable Vc is equal to or larger than the sum of the previous re-igniting base voltage variable Vc0 and the predetermined re-igniting base voltage determining constant $\Delta Vc$, and if it is "YES", the program flow goes to step ST204, but if it is "NO", the program flow goes to step ST202. This decision step is such that an anticipatory determination of a possible occurrence of the arc interruption according to the first arc interruption preventing method is performed. It is also to be noted that when the arc interruption is anticipatorily detected (i.e., in the event that a result of decision at step ST401 is "YES"), the program flow goes to step ST204 so that the peak current Ip is supplied by terminating the base current supply time Tb and forcibly initiating the peak current supply time Tp.

[Embodiment 3]

Referring to FIG. 16, there is shown a chart showing changes in welding current and voltage with time occurring during the performance of an AC pulsed arc welding according to the third embodiment of the present invention in which the second arc interruption preventing method is employed. In this figure, at a timing a detection wait time Td after the timing t4, based on the second arc interruption preventing method described previously with reference to FIG. 8 the base voltage increase rate dVb/dt is detected from time to time and, then, a decision is made to determine if the detected value of the base voltage increase rate is larger than the predetermined base voltage increase rate determining value $\Delta Vu$. At the timing 43, if a result of the decision indicates "YES", the arc interruption preventive current Ic of a value higher than the base current Ib is supplied. As the arc interruption preventive current Ic is supplied, the arc rigidity increases as described hereinbefore with the arc consequently pulled towards the normal course and, therefore, the negative point is newly formed at a location immediately beneath the welding wire and, hence, a favorable arcing continues without accompanied by the arc interruption subsequent to the re-ignition.

The welding power supply apparatus used in the practice of the third embodiment of the AC pulsed arc welding control method may be similar to that shown in FIG. 12, except that the software processing performed by the current waveform control circuit WC. The software processing performed by the current waveform control circuit WC in the practice of the third embodiment of the present invention is shown in FIG. 17. Accordingly, in the following description, only a portion of the Tb control subroutine that differs from that shown in FIG. 13 will be described. Note that blocks of steps ST501 to ST504 shown by the dotted lines in FIG. 17 are those added uniquely and not employed in the subroutine shown in FIG. 13.

Referring now to FIG. 17, at step ST501, a decision is made to determine if the product of the waveform counter variable n multiplied by the interruption time $\Delta T$ is equal to or larger than the sum of the peak current supply time setting signal Tp, the EN current supply time setting signal Ten and the detection wait time setting signal and if it is "YES", the program flow goes to step ST503, but if it is "NO", the program flow goes to step ST502. The decision at this step ST501 is to determine if the detection wait time Td has passed subsequent to the EP polarity switching. At step ST502, the welding voltage A/D conversion signal Adv read in at step ST201 is substituted for the base voltage variable Vu which is a variable used in the software process.

At step ST503, the base voltage variable Vu is substituted for the previous base voltage variable Vu0 and, at the same time, the welding voltage A/D conversion signal Adv read in at step ST201 is also substituted for the base voltage variable Vu. The base voltage variable Vu and the previous base voltage variable Vu0 are variables used in the software process.

At step ST504, a decision is made to determine if the difference between the base voltage variable Vu and the previous base voltage variable Vu0 is equal to or larger than the predetermined base voltage increase rate determining value $\Delta Vu$ and, if it is "YES", the program flow goes to ST305, but if it is "NO", the program flow goes to step ST202. The subtraction Vu–Vu is carried at intervals of the very small interruption time $\Delta T$ and does therefore correspond to calculation of dVb/dt. Also, the base voltage increase rate determining value $\Delta Vu$ is a constant used in the software process.

At this step, anticipatory determination of a possible occurrence of the arc interruption by means of the second arc interruption preventing method discussed with reference to FIG. 8 is performed and, once the possible occurrence of the arc interruption is detected (i.e., if a result of decision at step ST504 is "YES"), the arc interruption preventive current Ic is supplied by means of the process at step ST305.

[Embodiment 4]

Referring to FIG. 18, there is shown a chart showing changes in welding current and voltage with time occurring during the performance of an AC pulsed arc welding according to the fourth embodiment of the present invention in which the second arc interruption preventing method is employed. In this figure, at a timing a detection wait time Td after the timing t4, based on the second arc interruption preventing method described previously with reference to FIG. 8 the base voltage increase rate dVb/dt is detected from time to time and, then, a decision is made to determine if the detected value of the base voltage increase rate is larger than the predetermined base voltage increase rate determining value ΔVu. At the timing 43, if a result of the decision indicates "YES", the interval of the peak current supply time Tp is forcibly started with the peak current Ip of a value higher than the base current Ib consequently supplied. As the peak current Ip is supplied, the arc rigidity increases as described hereinbefore with the arc consequently pulled towards the normal course and, therefore, the negative point is newly formed at a location immediately beneath the welding wire and, hence, a favorable arcing continues without accompanied by the arc interruption subsequent to the re-ignition.

The welding power supply apparatus used in the practice of the fourth embodiment of the AC pulsed arc welding control method may be similar to that shown in FIG. 12, except that the software processing performed by the current waveform control circuit WC. The software processing performed by the current waveform control circuit WC in the practice of the fourth embodiment of the present invention is shown in FIG. 19. Accordingly, in the following description, only a portion of the Tb control subroutine that differs from that shown in FIG. 17 will be described. Note that a block of step ST601 shown by the dotted lines in FIG. 19 is those added uniquely and not employed in the subroutine shown in FIG. 17 Also, the block ST305 shown in FIG. 17 is eliminated in the flow chart of FIG. 19.

Referring to FIG. 19, at step ST601, a decision is made to determine if the difference between the base voltage variable Vu and the previous base voltage variable Vu0 is equal to or larger than the predetermined base voltage increase rate determining value ΔVu and, if it is "YES", the program flow goes to ST204, but if it is "NO", the program flow goes to step ST202. The decision at this step is an anticipatory determination of a possible occurrence of the arc interruption by means of the second arc interruption preventing method discussed with reference to FIG. 8 and, once the possible occurrence of the arc interruption is detected (i.e., if a result of decision at step ST601 is "YES"), the program flow goes to step ST204 to terminate the base current supply time Tb and, instead, to forcibly start the peak current supply time Tp to thereby supply the peak current Ip.

It is to be noted that in describing any one of the first to fourth preferred embodiments of the present invention, the current waveform control circuit WC has been described as utilizing the software processing. However, the current waveform control circuit WC may be implemented by a hardware circuit having a portion or the whole of those software executable functions.

FIGS. 20 to 23 are diagrams showing how the control method of the present invention is superior to the prior art control method when AC pulsed arc welding is effected to a workpiece made of a varying material under varying welding conditions. In those diagrams, the axis of ordinates represents the frequency of arc interruptions occurring per minute during the welding operation.

Figure 20:
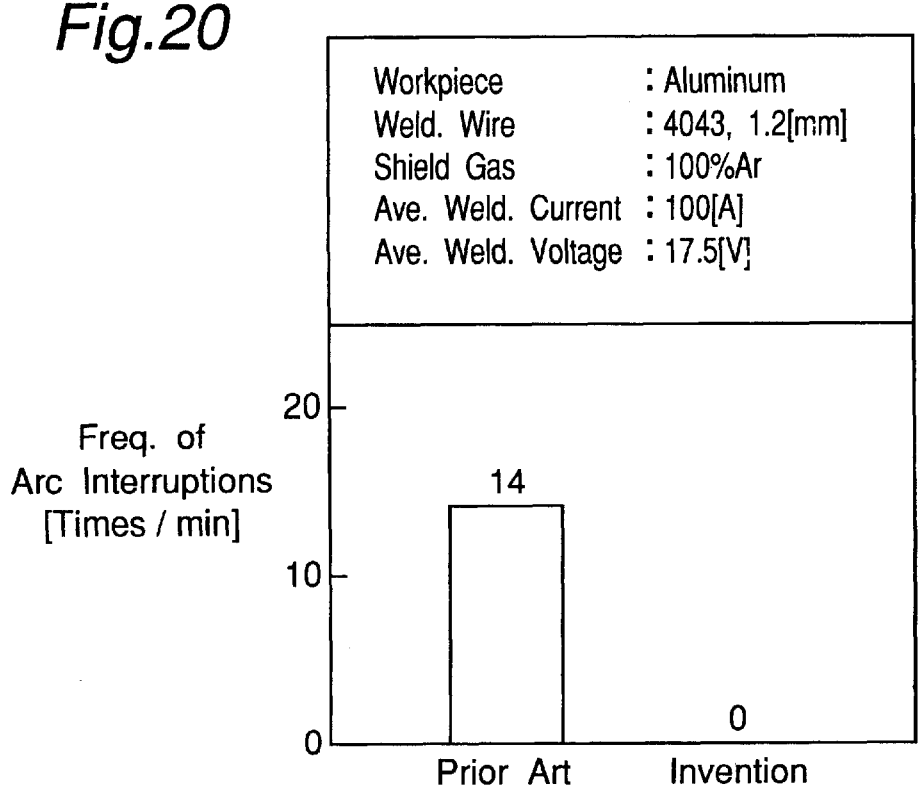
FIG. 20 is a diagram showing how the control method of the present invention is superior to the prior art control method when AC pulsed arc welding is effected to a workpiece made of aluminum.
Figure 21:
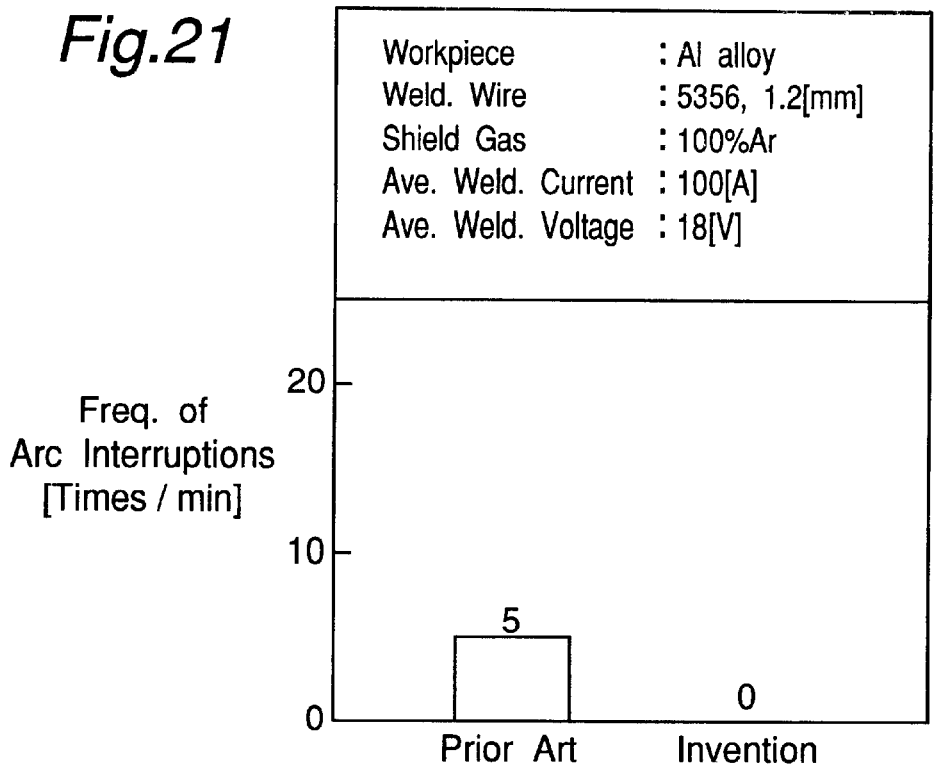
FIG. 21 is a diagram showing how the control method of the present invention is superior to the prior art control method when AC pulsed arc welding is effected to a workpiece made of an aluminum alloy.

FIG. 20 makes it clear that the frequency of arc interruptions was 14 times in the prior art and zero in the present invention when the AC pulsed arc welding was effected to the workpiece made of aluminum A1050, with the use of the 4043 welding wire of 1.2 mm in diameter and 100% argon gas for the shield gas and by the application of the average welding current of 100 A and an average welding voltage of 17.5 V FIG. 21 makes it clear that the frequency of arc interruptions was 15 times in the prior art and zero in the present invention when the AC pulsed arc welding was effected to the workpiece made of an aluminum alloy A5052, with the use of the 5356 welding wire of 1.2 mm in diameter and 100% argon gas for the shield gas and by the application of the average welding current of 100 A and an average welding voltage of 18 V.

Figure 22:
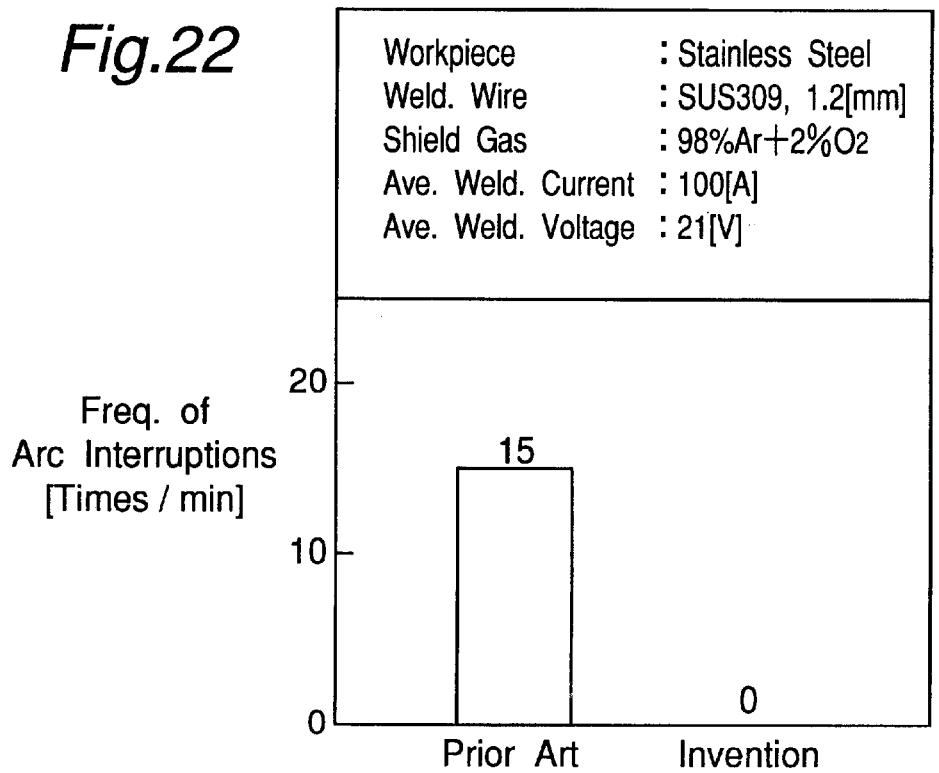
FIG. 22 is a diagram showing how the control method of the present invention is superior to the prior art control method when AC pulsed arc welding is effected to a workpiece made of stainless steel.

FIG. 22 makes it clear that the frequency of arc interruptions was 15 times in the prior art and zero in the present invention when the AC pulsed arc welding was effected to the workpiece made of stainless steel, with the use of the SUS309 welding wire of 1.2 mm in diameter and a gaseous mixture of 98% argon and 2% oxygen for the shield gas and by the application of the average welding current of 100 A and an average welding voltage of 21 V.

FIG. 23 makes it clear that the frequency of arc interruptions was 19 times in the prior art and zero in the present invention when the AC pulsed arc welding was effected to the workpiece made of mild steel, with the use of the mild steel welding wire of 1.2 mm in diameter and a gaseous mixture of 80% argon and 20% carbon dioxide for the shield gas and by the application of the average welding current of 100 A and an average welding voltage of 20.5 V.

Thus, as hereinbefore described, according to the AC pulsed arc welding control method and the welding power supply apparatus according to the present invention, detection is started the predetermined time after the supply of the base current Ib and, after the value detected from the base voltage becomes larger than the predetermined discriminant value, the current of a value higher than the base current Ib is supplied to prevent the arc interruption, which is apt to occur incident to the polarity switching, from occurring subsequent to the re-ignition. Accordingly, not only can the occurrence of the arc interruption during the course of welding be eliminated, but also a good welding results of a high quality can be obtained.

Although the present invention has been described in connection with the preferred embodiments thereof with reference to the accompanying drawings, it is to be noted that various changes and modifications are apparent to those skilled in the art. Such changes and modifications are to be understood as included within the scope of the present invention as defined by the appended claims, unless they depart therefrom.

What is claimed is:

1. A method of controlling a consumable electrode AC pulsed arc welding, said method comprising the steps of:
   repeatedly executing a cycle including:
      supplying a peak current sufficient to achieve a droplet transfer during a peak current supply time in an electrode positive polarity in which a welding current is supplied from a welding wire towards a workpiece to be welded;
      subsequently supplying an electrode negative current sufficient not to achieve the droplet transfer during an electrode negative current supply time in an electrode negative polarity in which the welding current is supplied from the workpiece to be welded towards the welding wire; and
      finally supplying a base current sufficient not to achieve the droplet transfer during a base current supply time in the electrode positive polarity,
   wherein when a re-igniting voltage, which is a base voltage established a predetermined time subsequent to start of the base current supply time, is higher than a sum of a re-igniting base voltage appearing during the previous cycle and a discriminant value of a predetermined re-igniting base voltage, a current of a value higher than the base current is supplied during a period from the timing at which the re-igniting base voltage takes a value higher than the sum to the timing at which the peak current supply time starts.

2. A method of controlling a consumable electrode AC pulsed arc welding, said method comprising the steps of:

repeatedly executing a cycle including:

supplying a peak current sufficient to achieve a droplet transfer during a peak current supply time in an electrode positive polarity in which a welding current is supplied from a welding wire towards a workpiece to be welded;

subsequently supplying an electrode negative current sufficient not to achieve the droplet transfer during an electrode negative current supply time in an electrode negative polarity in which the welding current is supplied from the workpiece to be welded towards the welding wire; and finally supplying a base current sufficient not to achieve the droplet transfer during a base current supply time in the electrode positive polarity, wherein when a re-igniting voltage, which is a base voltage established a predetermined time subsequent to start of the base current supply time is higher than a sum of a re-igniting base voltage appearing during the previous cycle and a discriminant value of a predetermined re-igniting base voltage, the peak current supply time for the subsequent cycle is initiated at the timing at which the re-igniting base voltage takes a value higher than the sum to thereby supply the peak current.

3. A method of controlling a consumable electrode AC pulsed arc welding, said method comprising the steps of:

repeatedly executing a cycle including:

supplying a peak current sufficient to achieve a droplet transfer during a peak current supply time in an electrode positive polarity in which a welding current is supplied from a welding wire towards a workpiece to be welded;

subsequently supplying an electrode negative current sufficient not to achieve the droplet transfer during an electrode negative current supply time in an electrode negative polarity in which the welding current is supplied from the workpiece to be welded towards the welding wire; and finally supplying a base current sufficient not to achieve the droplet transfer during a base current supply time in the electrode positive polarity, wherein when the rate of increase of the base voltage during the base current supply time is higher than the predetermined discriminant value, the current of a value higher than the base current is supplied during a period from the timing at which the rate of increase attains a value higher than the predetermined discriminant value to the timing at which the peak current supply time starts.

4. A method of controlling a consumable electrode AC pulsed arc welding, said method comprising the steps of:

repeatedly executing a cycle including:

supplying a peak current sufficient to achieve a droplet transfer during a beam current supply time in an electrode positive polarity in which a welding current is supplied from a welding wire towards a workpiece to be welded;

subsequently supplying an electrode negative current sufficient not to achieve the droplet transfer during an electrode negative current supply time in an electrode negative polarity in which the welding current is supplied from the workpiece to be welded towards the welding wire; and finally supplying a base current sufficient not to achieve the droplet transfer during a base current supply time in the electrode positive polarity, wherein when the rate of increase of the base voltage during the base current supply time is higher than the predetermined discriminant value, the peak current supply time for the subsequent cycle is initiated from the timing at which the rate of increase attains a value higher than the predetermined discriminant value to thereby supply the peak current.

* * * * *